(12) United States Patent
Chou et al.

(10) Patent No.: US 10,949,315 B2
(45) Date of Patent: Mar. 16, 2021

(54) PERFORMANCE MEASUREMENTS RELATED TO VIRTUALIZED RESOURCES

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/464,840

(22) PCT Filed: Jun. 7, 2018

(86) PCT No.: PCT/US2018/036397
§ 371 (c)(1),
(2) Date: May 29, 2019

(87) PCT Pub. No.: WO2018/226920
PCT Pub. Date: Dec. 13, 2018

(65) Prior Publication Data
US 2020/0089589 A1    Mar. 19, 2020

Related U.S. Application Data

(60) Provisional application No. 62/516,475, filed on Jun. 7, 2017, provisional application No. 62/539,928, filed on Aug. 1, 2017.

(51) Int. Cl.
*G06F 11/30* (2006.01)
*G06F 9/50* (2006.01)
*G06F 11/34* (2006.01)

(52) U.S. Cl.
CPC .......... *G06F 11/301* (2013.01); *G06F 9/5077* (2013.01); *G06F 11/3006* (2013.01); *G06F 11/3409* (2013.01)

(58) Field of Classification Search
CPC .... G06F 11/30; G06F 9/5077; G06F 11/3006; G06F 11/3409
(Continued)

(56) References Cited

U.S. PATENT DOCUMENTS 7,406,099 B2 * 7/2008 Schlagintweit .... H04Q 11/0435
370/468
10,454,989 B2 * 10/2019 Ouyang ................ H04L 41/142
(Continued)

FOREIGN PATENT DOCUMENTS

WO    2017/078790 A1    5/2017

OTHER PUBLICATIONS

International Search Report and Written Opinion dated Sep. 7, 2018 for PCT Application PCT/US2018/036397.
(Continued)

*Primary Examiner* — Tauqir Hussain
(74) *Attorney, Agent, or Firm* — Eschweiler & Potashnik, LLC

(57) ABSTRACT

Techniques for generating and communicating performance measurements related to virtualized resources (VRs) are discussed. A first set of embodiments discusses relate to generating and communicating 3GPP NF performance measurements related to VR. A second set of embodiments relate to generating and communication VR-related performance measurements over specific reference points (e.g., Ve-Vnfm-em, Or-Vnfm, Or-Vi, Os-Ma-nfvo, etc.) of a management architecture for network function virtualization (NFV).

31 Claims, 16 Drawing Sheets

(58) Field of Classification Search
USPC ........................................................ 709/224
See application file for complete search history.

(56) References Cited

U.S. PATENT DOCUMENTS

| | | | |
|---|---|---|---|
| 2008/0009279 A1* | 1/2008 | Sakawa | H04W 24/00 |
| | | | 455/423 |
| 2016/0205004 A1* | 7/2016 | Chou | H04L 41/0896 |
| | | | 709/224 |
| 2017/0244777 A1* | 8/2017 | Ouyang | H04L 43/08 |

OTHER PUBLICATIONS

International Preliminary Report on Patentability dated Dec. 10, 2019 for PCT Application PCT/US2018/036397.

* cited by examiner

PERFORMANCE MEASUREMENTS RELATED TO VIRTUALIZED RESOURCES

REFERENCE TO RELATED APPLICATIONS

This application is a National Phase entry application of International Patent Application No. PCT/US2018/036397 filed Jun. 7, 2018, which claims priority to U.S. Provisional Applications No. 62/516,475 filed Jun. 7, 2017, entitled "METHOD AND SYSTEM TO COLLECT NETWORK FUNCTIONS VIRTUALIZATION (NFV) INFRASTRUCTURE PERFORMANCE MEASUREMENTS", and No. 62/539,928 filed Aug. 1, 2017, entitled "NETWORK FUNCTION PERFORMANCE MEASUREMENTS RELATED TO VIRTUALIZED RESOURCES", and is hereby incorporated by reference in its entirety.

FIELD

The present disclosure relates to core network technology of a communication network, and more specifically to techniques for generating and communicating performance measurements related to virtualized resources.

BACKGROUND

Network Function Virtualization (NFV) involves the replacement of physical network nodes with Virtual Network Functions (VNFs) implemented via Virtualized Resources (VRs) that perform the same function as the physical node.

DETAILED DESCRIPTION

Figure 1:
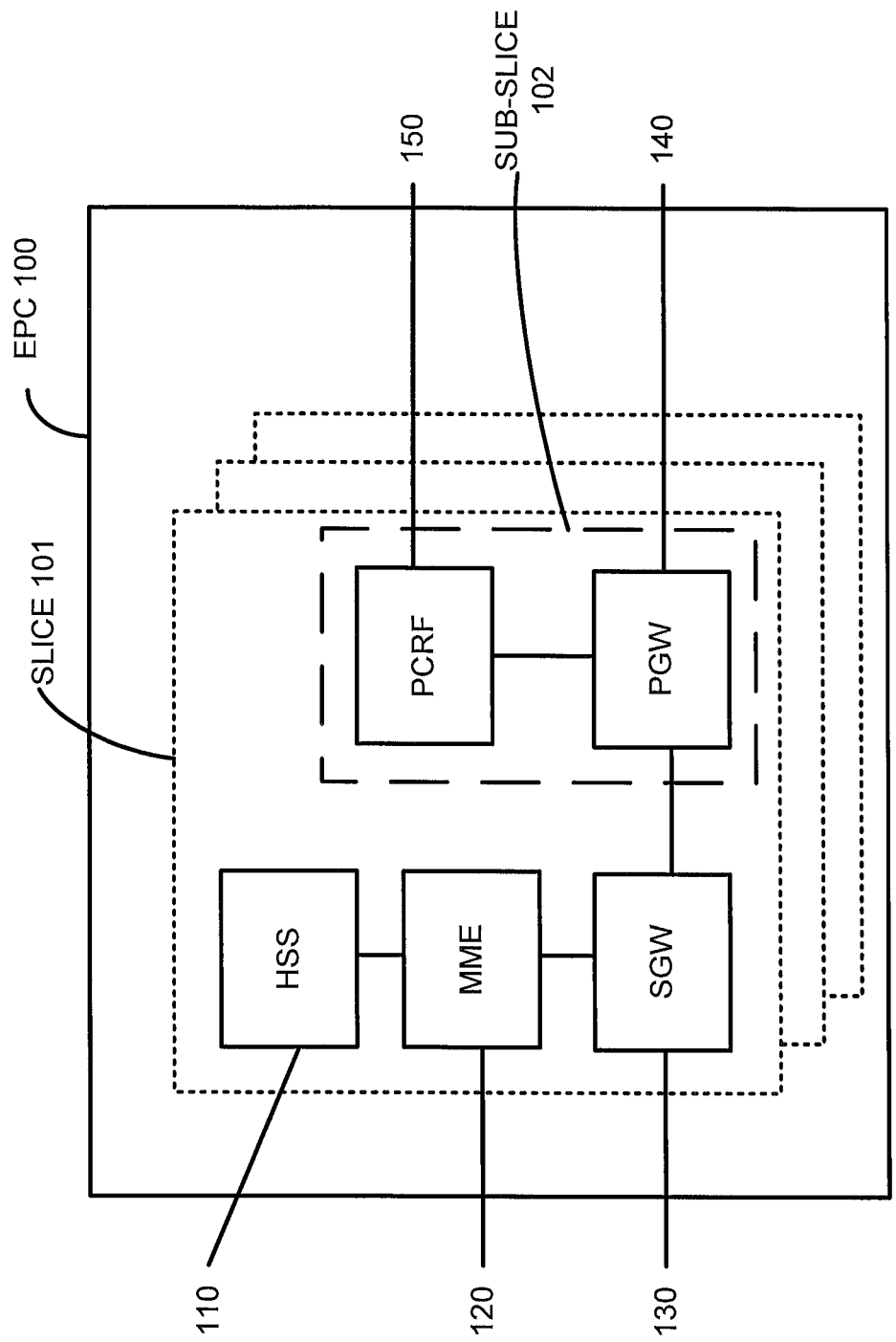
FIG. 1 is a diagram illustrating components of a network in accordance with some embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates components of a network in accordance with some embodiments. In various aspects, part(s) or all of one or more of the components illustrated in connection with FIG. 1 can be implemented as virtual network functions (VNFs) in connection with various aspects described herein. An Evolved Packet Core (EPC) network 100 is shown to include a Home Subscriber Server (HSS) 110, a Mobility Management Entity (MME) 120, a Serving GateWay (SGW) 130, a Packet Data Network (PDN) GateWay (PGW) 140, a Policy and Charging Rules Function (PCRF) 150.

The HSS 110 comprises one or more databases for network users, including subscription-related information to support the network entities' handling of communication sessions. For example, the HSS 110 may provide support for routing/roaming, authentication, authorization, naming/addressing resolution, location dependencies, etc. The EPC network 100 may comprise one or several HSSs 110, depending on the number of mobile subscribers, on the capacity of the equipment, on the organization of the network, etc.

The MME 120 is similar in function to the control plane of legacy Serving General packet radio service (GPRS) Support Nodes (SGSN). The MMEs 120 manage mobility aspects in access such as gateway selection and tracking area list management. The EPC network 100 may comprise one or several MMEs 120

The SGW 130 terminates the interface toward an Evolved UMTS (Universal Mobile Telecommunications System) Terrestrial Radio Access Network (E-UTRAN), and routes data packets between the E-UTRAN and the EPC network 100. In addition, the SGW 130 may be a local mobility anchor point for inter-eNodeB handovers and also may provide an anchor for inter-3GPP mobility. Other responsibilities may include lawful intercept, charging, and some policy enforcement.

The PGW 140 terminates an SGi interface toward the PDN. The PGW 140 routes data packets between the EPC network 100 and external networks, and may be a node for policy enforcement and charging data collection. The PCRF 150 is the policy and charging control element of the EPC network 100. In a non-roaming scenario, there may be a single PCRF in the Home Public Land Mobile Network (HPLMN) associated with a User Equipment's (UE) Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 150 may be communicatively coupled to an application server (alternatively referred to as application function (AF)). Generally, the application server is an element offering applications that use Internet Protocol (IP) bearer resources with the core network (e.g., UMTS Packet Services (PS) domain, Long Term Evolution (LTE) PS data services, etc.). The application server may signal the PCRF 150 to indicate a new service flow and selecting the appropriate Quality of Service (QoS) and charging parameters. The PCRF 150 may provision this rule into a Policy and Charging Enforcement Function (PCEF) (not shown) with the appropriate traffic flow template (TFT) and QoS class of identifier (QCI), which commences the QoS and charging as specified by the application server.

The components of the EPC 100 may be implemented in one physical node or separate physical nodes. In some embodiments, Network Functions Virtualization (NFV) is utilized to virtualize any or all of the above described network node functions via executable instructions stored in one or more computer readable storage mediums (described in further detail below). A logical instantiation of the EPC network 100 may be referred to as a network slice 101. A logical instantiation of a portion of the EPC network 100 may be referred to as a network sub-slice 102 (e.g., the network sub-slice 102 is shown to include the PGW 140 and the PCRF 150).

Figure 2:
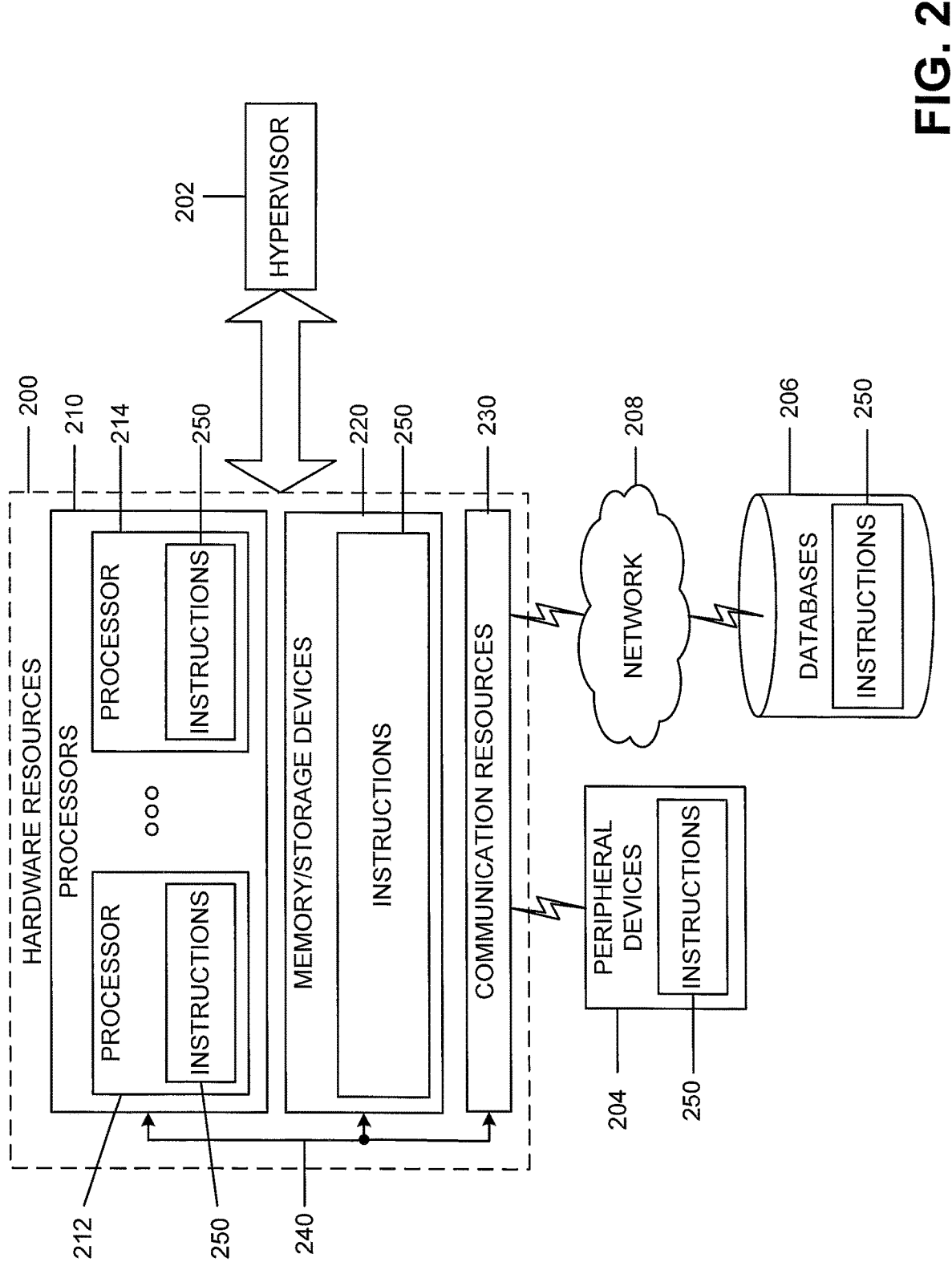
FIG. 2 is a block diagram illustrating components, according to some example embodiments, able to read instructions from a machine-readable or computer-readable medium (e.g., a machine-readable storage medium) and perform any one or more of the methodologies discussed herein.

FIG. 2 is a block diagram illustrating components, according to some example embodiments, able to read instructions from a machine-readable or computer-readable medium (e.g., a machine-readable storage medium) and perform any one or more of the methodologies discussed herein. Specifically, FIG. 2 shows a diagrammatic representation of hardware resources 200 including one or more processors (or processor cores) 210, one or more memory/storage devices 220, and one or more communication resources 230, each of which are communicatively coupled via a bus 240. For embodiments where node virtualization (e.g., NFV) is utilized, a hypervisor 202 may be executed to provide an execution environment for one or more network slices/sub-slices to utilize the hardware resources 200.

The processors 210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 212 and a processor 214. The memory/storage devices 220 may include main memory, disk storage, or any suitable combination thereof.

The communication resources 230 may include interconnection and/or network interface components or other suitable devices to communicate with one or more peripheral devices 204 and/or one or more databases 206 via a network 208. For example, the communication resources 230 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 250 may comprise software, a program, an application, an applet, an app, or other executable code for causing at least any of the processors 210 to perform any one or more of the methodologies discussed herein. The instructions 250 may reside, completely or partially, within at least one of the processors 210 (e.g., within the processor's cache memory), the memory/storage devices 220, or any suitable combination thereof. Furthermore, any portion of the instructions 250 may be transferred to the hardware resources 200 from any combination of the peripheral devices 204 and/or the databases 206. Accordingly, the memory of processors 210, the memory/storage devices 220, the peripheral devices 204, and the databases 206 are examples of computer-readable and machine-readable media.

Figure 3:
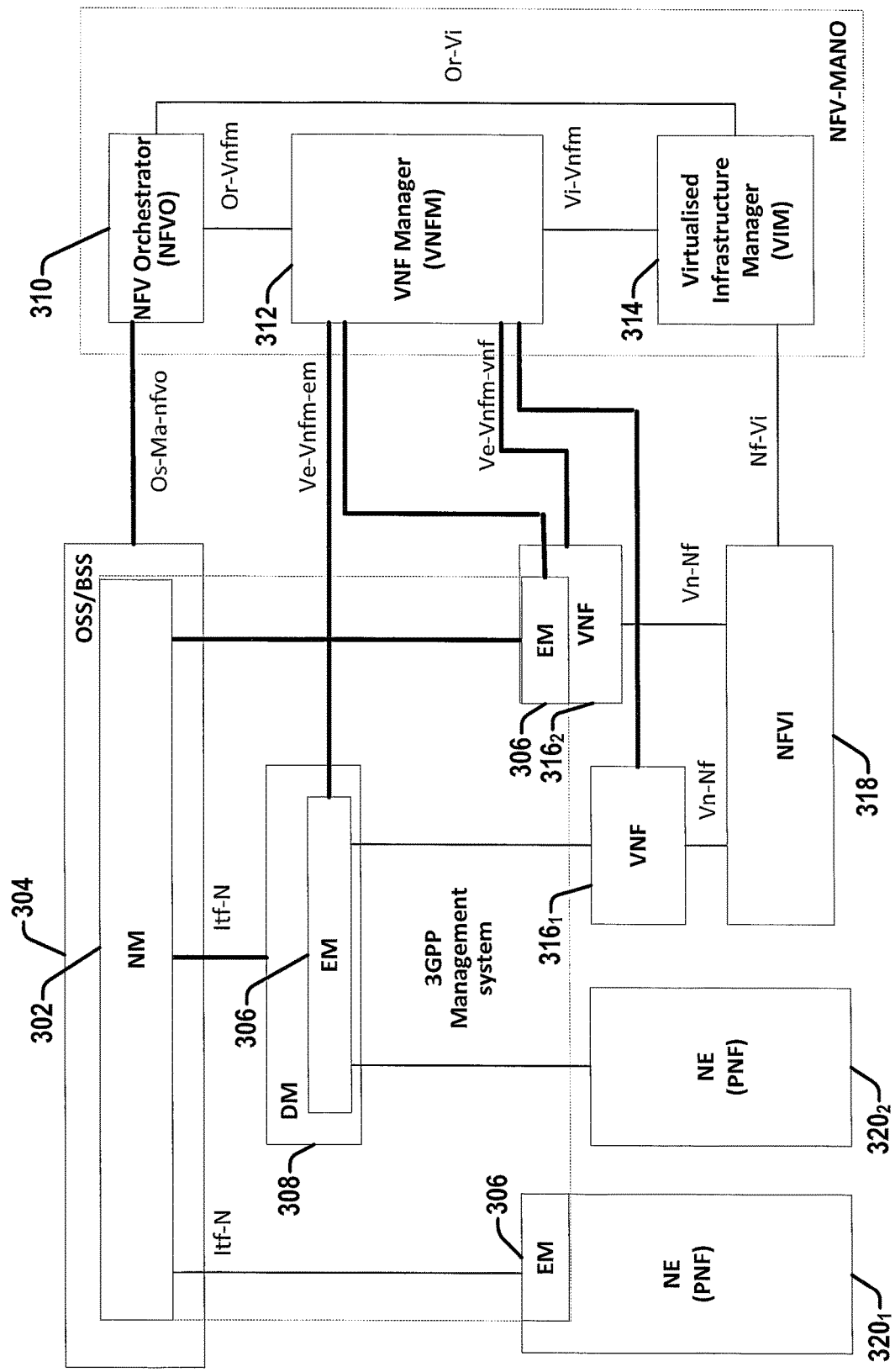
FIG. 3 is a diagram of an example architecture that facilitates support of lifecycle management by a 3GPP (Third Generation Partnership Project) management system, according to various aspects described herein.

Referring to FIG. 3, illustrated is a diagram of an example architecture that facilitates generation and communication of performance measurements related to virtualized resources, according to various aspects described herein. The system illustrated in FIG. 3 comprises a Network Manager (NM) 302, Operation Support Systems (OSS)/Business Support Systems 304, network Element Manager (EM) 306, Domain Manager (DM) 308, Network Function Virtualization (NFV) Management and Orchestration (MANO) components (NFV Orchestrator (NFVO) 310, VNF Manager (VNFM) 312, and Virtualized Infrastructure Manager (VIM) 314, a set of Virtualized Network Functions (VNFs) $316_i$ virtualized by Virtualized resources (VRs) of a NFV Infrastructure (NFVI) 318 (which can comprise a hypervisor such as hypervisor 202 and hardware resources such as hardware resources 200), and optionally one or more Network Entities (NEs) $320i$ that can implement Physical Network Functions (PNFs). The lines between these entities indicate reference points or other communication connections that can facilitate data exchange between these entities (some of which are labeled, such as reference point Itf-N, etc.).

In a NFV (Network Function Virtualization) environment, the performance of a 3GPP (Third Generation Partnership Project) NF (Network Function) can be impacted by the underlying VRs (Virtualized resources, e.g., virtual CPUs, virtual memories and virtual storages). To enable the operator to analyze the impact of the VRs to the performance of the 3GPP NF, the performance of the VRs can be monitored. Several use cases for collecting 3GPP NF performance measurements related to VR are specified in 3GPP TS (Technical Specification) 28.520. Techniques discussed herein can update performance management in NFV scenarios, and improve on existing techniques by employing the measurements for EPC (Evolved Packet Core) and IMS (IP (Internet Protocol) Multimedia Subsystem) related to VR that are absent in existing techniques.

In various aspects, new measurement collection techniques discussed herein can be employed for 3GPP performance measurements related to VR.

The 3GPP management entities that can collect the 3GPP NF performance measurements related to VR and NFV-MANO (Network Function Virtualization (NFV) Management and Orchestration (MANO)) entities that can collect the VR related performance measurements are shown in FIG. 3.

The Performance Management Interface has been defined for reference point Ve-Vnfm-em, reference point Or-Vnfm, reference point Or-Vi, and reference point Os-Mo-nfvo, each of which is shown in FIG. 3. However, although operations to create a PM (Performance Measurement) job and notify regarding the availability of PM data have been specified for the above-mentioned reference points, the performance measurements (e.g., performance PM data, performance metrics, etc.) have not yet been defined.

The management entities (e.g., EM, VNFM, NFVO, etc.) of these reference points can use such performance measurements for their own purposes.

Accordingly, in various aspects, performance measurements defined herein can be employed.

Figure 4:
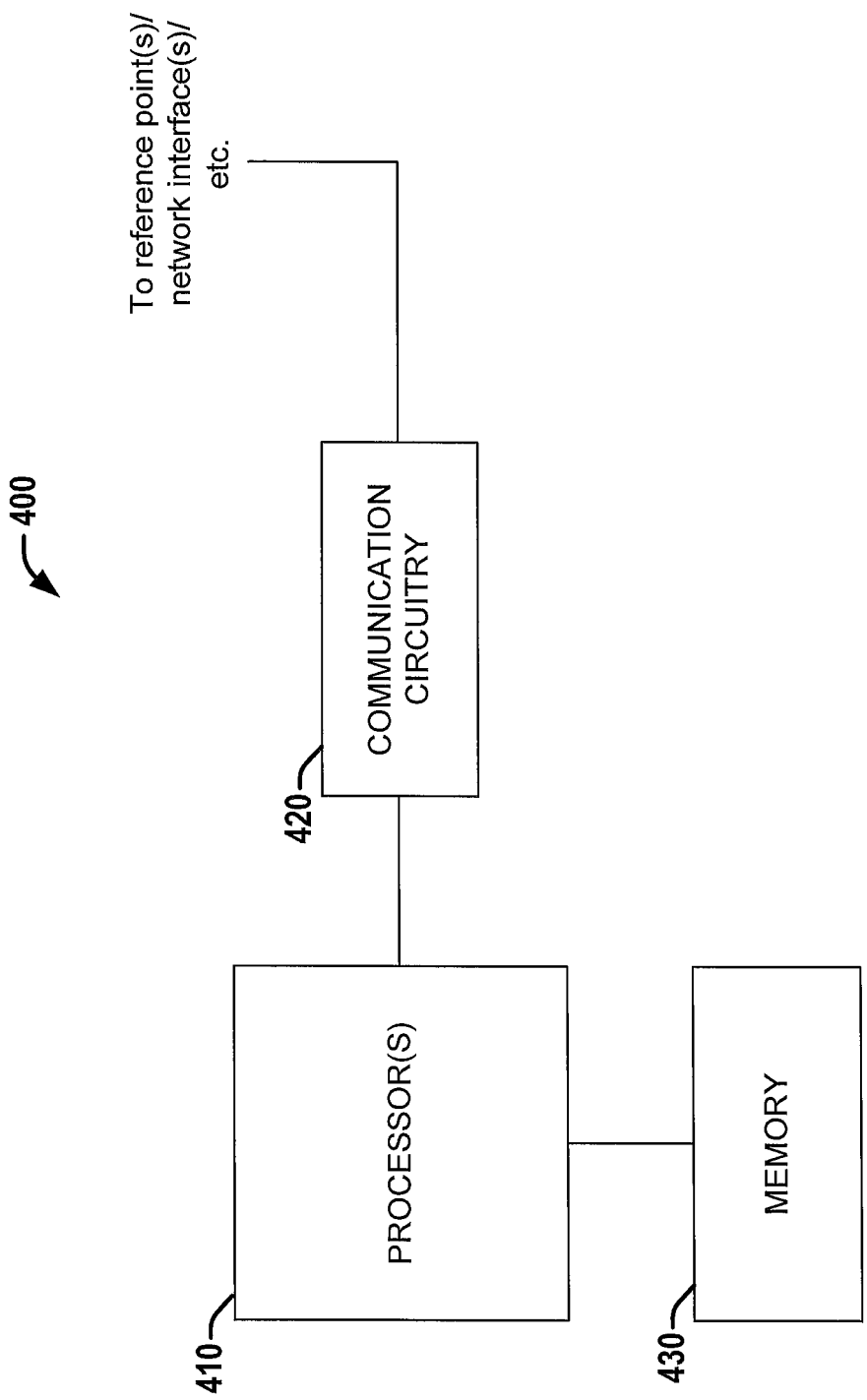
FIG. 4 is a block diagram of a system employable by a Network Manager (NM) that facilitates generating and communicating Network Function (NF) performance measurements related to virtualized resources, according to various aspects described herein.

Referring to FIG. 4, illustrated is a block diagram of a system 400 employable by a Network Manager (NM) that facilitates generation and communication of performance measurements related to virtualized resources, according to various aspects described herein. System 400 can comprise one or more processors 410 (e.g., which can comprise one or more of processor(s) 210, etc., each of which can comprise processing circuitry and one or more interfaces for send/receive data to/from each other or other circuitry, such as a memory interface to send/receive data to/from memory 430, a communication circuitry interface to send/receive data to/from communication circuitry 420, etc.), communication circuitry 420 (which can facilitate communication of data via one or more reference points, networks, etc., and can comprise communication resource(s) 230, etc.), and memory 430 (which can comprise any of a variety of storage mediums and can store instructions and/or data associated with at least one of the one or more processors 410 or communication circuitry 420, and can comprise memory/storage device(s) 220 and/or cache memory of processor(s) 410, etc.). In some aspects, the one or more processors 410, the communication circuitry 420, and the memory 430 can be included in a single device, while in other aspects, they can be included in different devices, such as part of a distributed architecture. As described in greater detail below, system 400 can be employed by a NM to facilitate generation and communication of performance measurements related to virtualized resources, in various embodiments.

Figure 5:
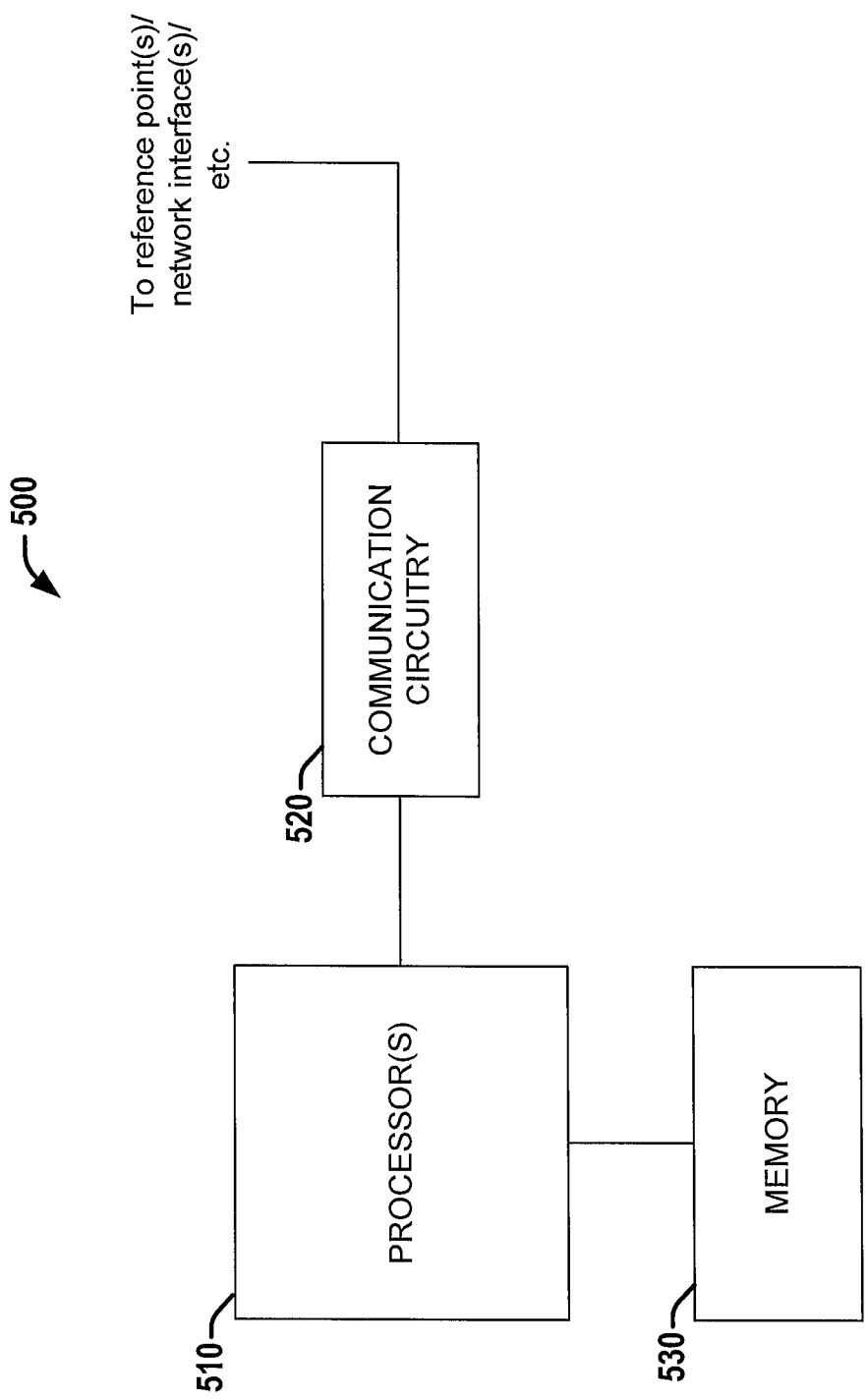
FIG. 5 is a block diagram of a system employable by Operation Support Systems (OSS) that facilitates generating and communicating performance measurements related to virtualized resources, according to various aspects described herein.

Referring to FIG. 5, illustrated is a block diagram of a system 500 employable by Operation Support Systems (OSS) that facilitates generation and communication of performance measurements related to virtualized resources, according to various aspects described herein. System 500 can comprise one or more processors 510 (e.g., which can comprise one or more of processor(s) 210, etc., each of which can comprise processing circuitry and one or more interfaces for send/receive data to/from each other or other circuitry, such as a memory interface to send/receive data to/from memory 530, a communication circuitry interface to send/receive data to/from communication circuitry 520, etc.), communication circuitry 520 (which can facilitate communication of data via one or more reference points, networks, etc., and can comprise communication resource(s) 230, etc.), and memory 530 (which can comprise any of a variety of storage mediums and can store instructions and/or data associated with at least one of the one or more processors 510 or communication circuitry 520, and can comprise memory/storage device(s) 220 and/or cache memory of processor(s) 510, etc.). In some aspects, the one or more processors 510, the communication circuitry 520, and the memory 530 can be included in a single device, while in other aspects, they can be included in different devices, such as part of a distributed architecture. As described in greater detail below, system 500 can be employed by OSS to facilitate generation and communication of performance measurements related to virtualized resources, in various embodiments.

Figure 6:
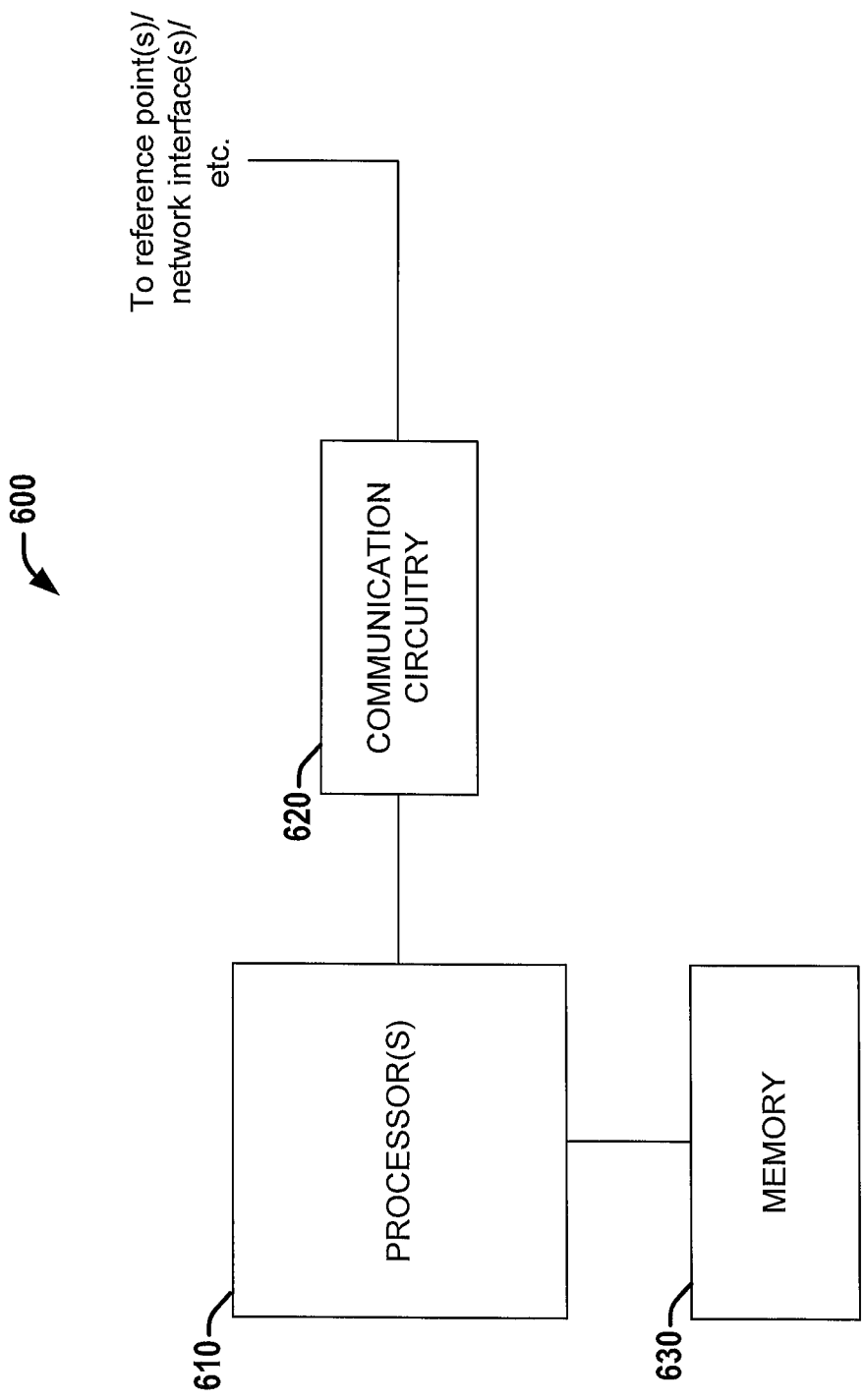
FIG. 6 is a block diagram of a system employable by a network Element Manager (EM) that facilitates generating and communicating performance measurements related to virtualized resources, according to various aspects described herein.

Referring to FIG. 6, illustrated is a block diagram of a system 600 employable by a network Element Manager (EM) that facilitates generation and communication of performance measurements related to virtualized resources, according to various aspects described herein. System 600 can comprise one or more processors 610 (e.g., which can comprise one or more of processor(s) 210, etc., each of which can comprise processing circuitry and one or more interfaces for send/receive data to/from each other or other circuitry, such as a memory interface to send/receive data to/from memory 630, a communication circuitry interface to send/receive data to/from communication circuitry 620, etc.), communication circuitry 620 (which can facilitate communication of data via one or more reference points, networks, etc., and can comprise communication resource(s) 230, etc.), and memory 630 (which can comprise any of a variety of storage mediums and can store instructions and/or data associated with at least one of the one or more processors 610 or communication circuitry 620, and can comprise memory/storage device(s) 220 and/or cache memory of processor(s) 610, etc.). In some aspects, the one or more processors 610, the communication circuitry 620, and the memory 630 can be included in a single device, while in other aspects, they can be included in different devices, such as part of a distributed architecture. As described in greater detail below, system 600 can be employed by an EM to facilitate generation and communication of performance measurements related to virtualized resources, in various embodiments.

Figure 7:
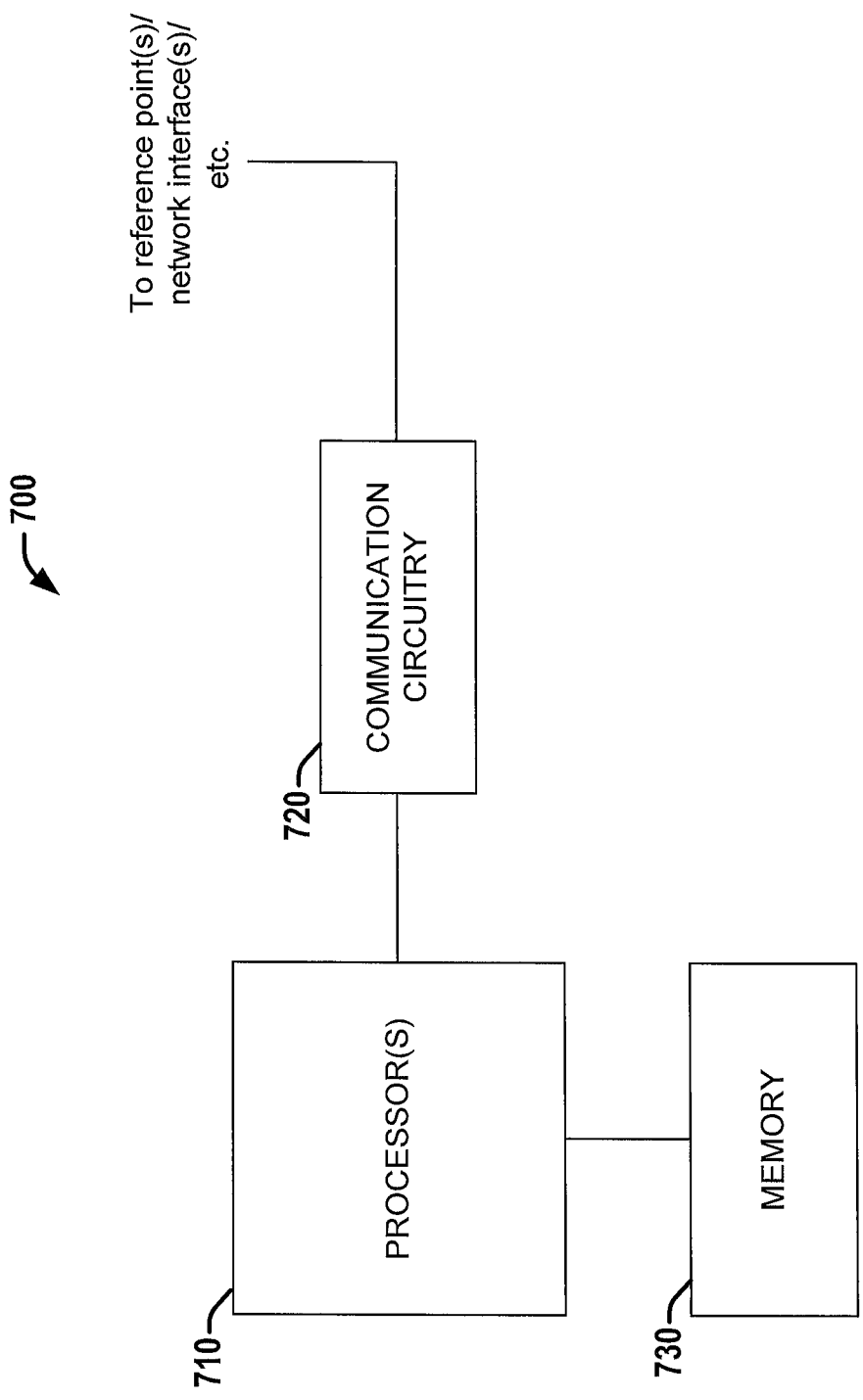
FIG. 7 is a block diagram of a system employable by a Network Function Virtualization (NFV) Orchestrator (NFVO) that facilitates generating and communicating performance measurements related to virtualized resources, according to various aspects described herein.

Referring to FIG. 7, illustrated is a block diagram of a system 700 employable by a Network Function Virtualization (NFV) Orchestrator (NFVO) that facilitates generation and communication of performance measurements related to virtualized resources, according to various aspects described herein. System 700 can comprise one or more processors 710 (e.g., which can comprise one or more of processor(s) 210, etc., each of which can comprise processing circuitry and one or more interfaces for send/receive data to/from each other or other circuitry, such as a memory interface to send/receive data to/from memory 730, a communication circuitry interface to send/receive data to/from communication circuitry 720, etc.), communication circuitry 720 (which can facilitate communication of data via one or more reference points, networks, etc., and can comprise communication resource(s) 230, etc.), and memory 730 (which can comprise any of a variety of storage mediums and can store instructions and/or data associated with at least one of the one or more processors 710 or communication circuitry 720, and can comprise memory/storage device(s) 220 and/or cache memory of processor(s) 710, etc.). In some aspects, the one or more processors 710, the communication circuitry 720, and the memory 730 can be included in a single device, while in other aspects, they can be included in different devices, such as part of a distributed architecture. As described in greater detail below, system 700 can be employed by a NFVO to facilitate generation and communication of performance measurements related to virtualized resources, in various embodiments.

Figure 8:
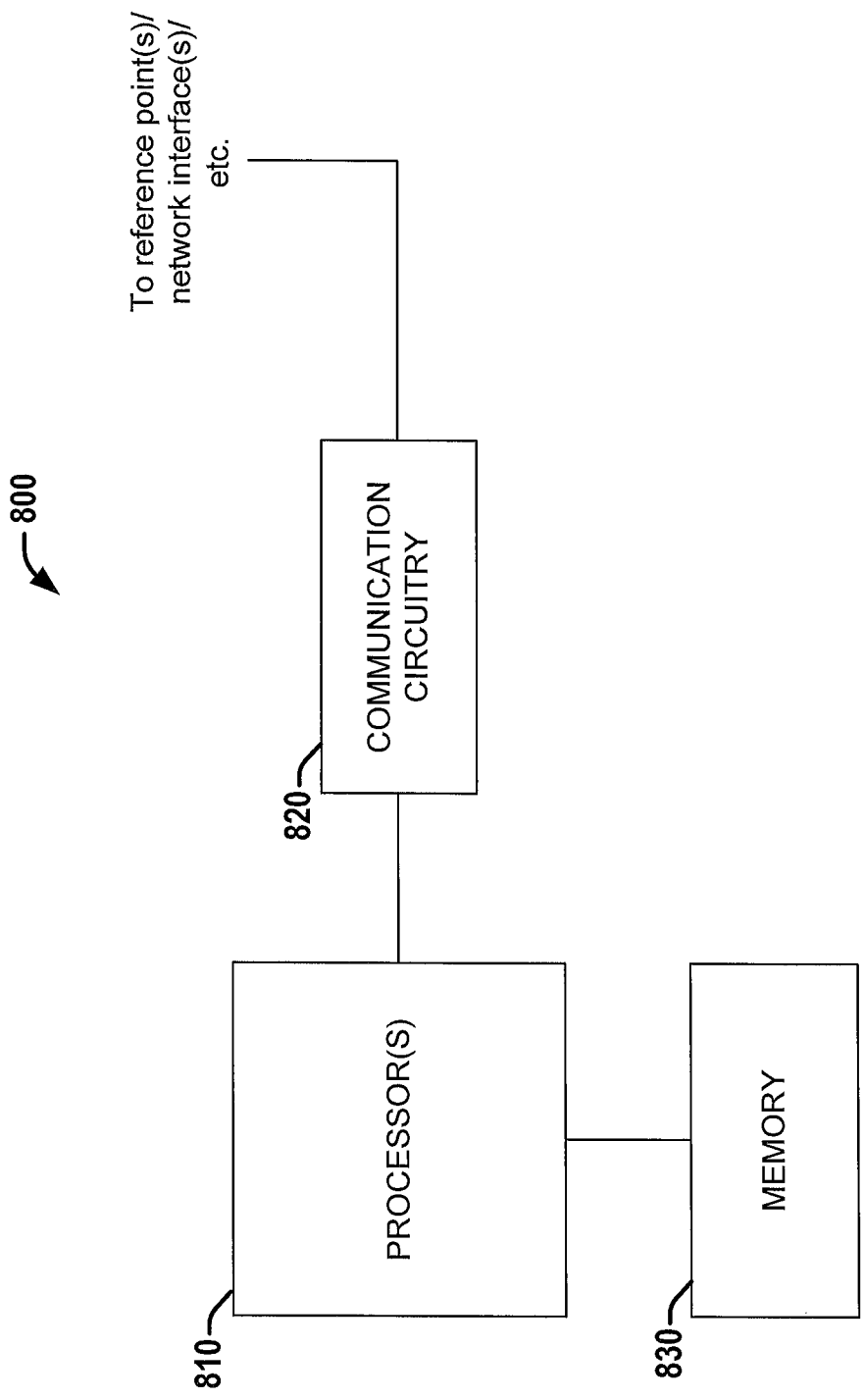
FIG. 8 is a block diagram of a system employable by a Virtual Network Function Manager (VNFM) that facilitates generating and communicating performance measurements related to virtualized resources, according to various aspects described herein.

Referring to FIG. 8, illustrated is a block diagram of a system 800 employable by a Virtual Network Function Manager (VNFM) that facilitates generation and communication of performance measurements related to virtualized resources, according to various aspects described herein. System 800 can comprise one or more processors 810 (e.g., which can comprise one or more of processor(s) 210, etc., each of which can comprise processing circuitry and one or more interfaces for send/receive data to/from each other or other circuitry, such as a memory interface to send/receive data to/from memory 830, a communication circuitry interface to send/receive data to/from communication circuitry 820, etc.), communication circuitry 820 (which can facilitate communication of data via one or more reference points, networks, etc., and can comprise communication resource(s) 230, etc.), and memory 830 (which can comprise any of a variety of storage mediums and can store instructions and/or data associated with at least one of the one or more processors 810 or communication circuitry 820, and can comprise memory/storage device(s) 220 and/or cache memory of processor(s) 810, etc.). In some aspects, the one or more processors 810, the communication circuitry 820, and the memory 830 can be included in a single device, while in other aspects, they can be included in different devices, such as part of a distributed architecture. As described in greater detail below, system 800 can be employed by a VNFM to facilitate generation and communication of performance measurements related to virtualized resources, in various embodiments.

Figure 9:
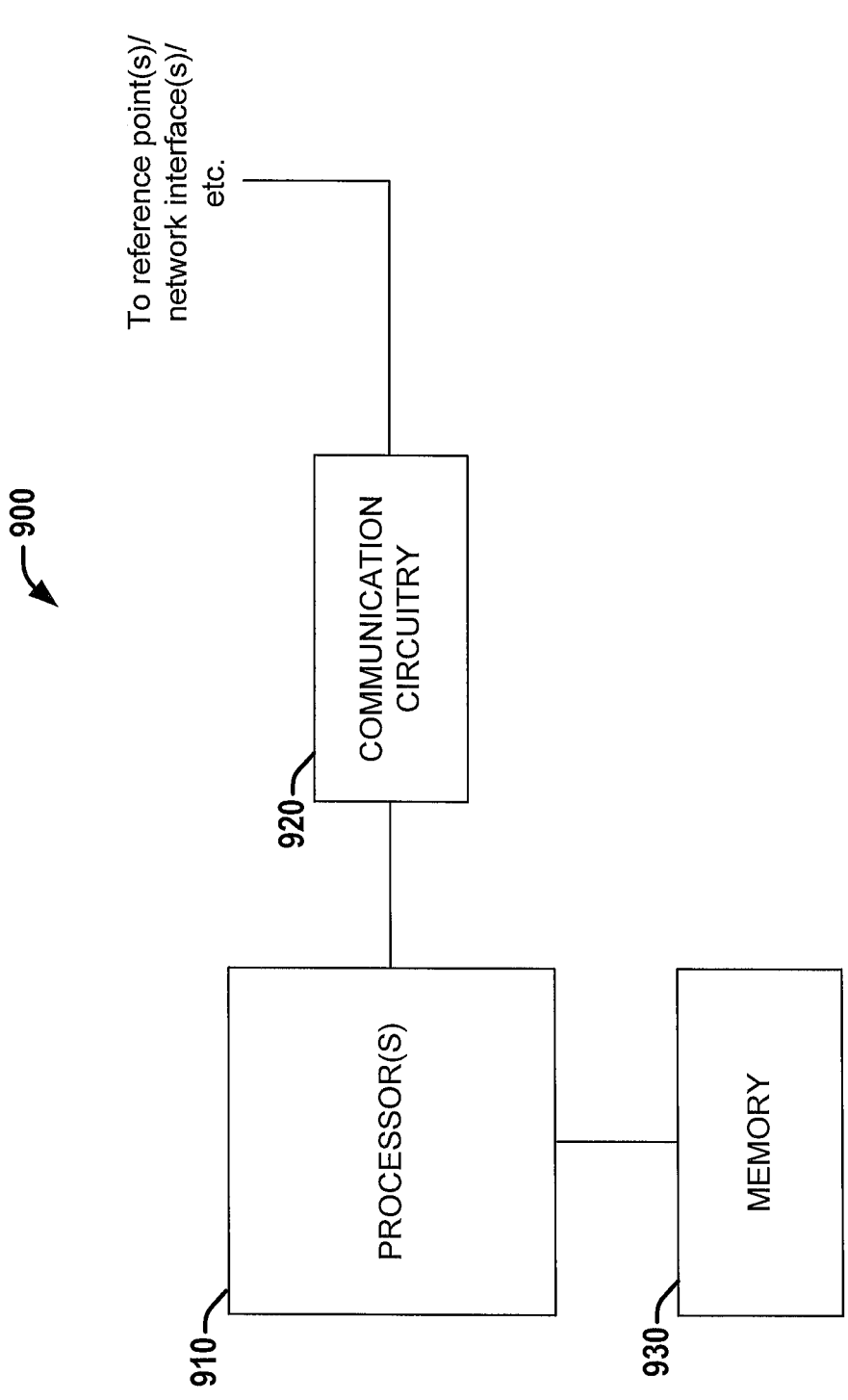
FIG. 9 is a block diagram of a system employable by a Virtualization Infrastructure Manager (VIM) that facilitates generating and communicating performance measurements related to virtualized resources, according to various aspects described herein.

Referring to FIG. 9, illustrated is a block diagram of a system 900 employable by a Virtualized Infrastructure Manager (VIM) that facilitates generation and communication of performance measurements related to virtualized resources, according to various aspects described herein. System 900 can comprise one or more processors 910 (e.g., which can comprise one or more of processor(s) 210, etc., each of which can comprise processing circuitry and one or more interfaces for send/receive data to/from each other or other circuitry, such as a memory interface to send/receive data to/from memory 930, a communication circuitry interface to send/receive data to/from communication circuitry 920, etc.), communication circuitry 920 (which can facilitate communication of data via one or more reference points, networks, etc., and can comprise communication resource(s) 230, etc.), and memory 930 (which can comprise any of a variety of storage mediums and can store instructions and/or data associated with at least one of the one or more processors 910 or communication circuitry 920, and can comprise memory/storage device(s) 220 and/or cache memory of processor(s) 910, etc.). In some aspects, the one or more processors 910, the communication circuitry 920, and the memory 930 can be included in a single device, while in other aspects, they can be included in different devices, such as part of a distributed architecture. As described in greater detail below, system 900 can be employed by a VIM to facilitate generation and communication of performance measurements related to virtualized resources, in various embodiments.

Figure 10:
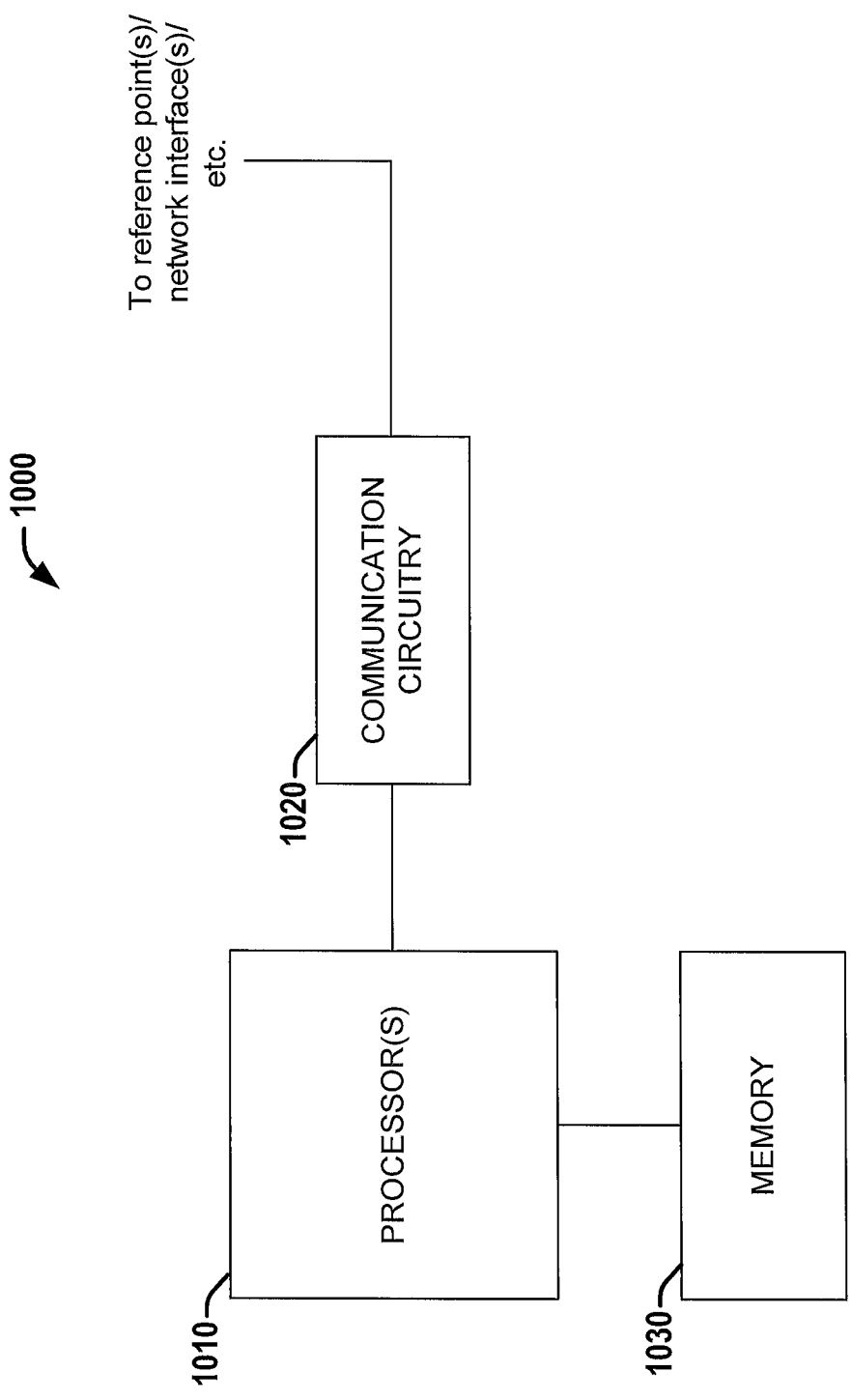
FIG. 10 is a block diagram of a system employable by a Network Function Virtualization (NFV) Infrastructure (NFVI) that facilitates generating and communicating performance measurements related to virtualized resources, according to various aspects described herein.

Referring to FIG. 10, illustrated is a block diagram of a system 1000 employable by a Network Function Virtualization Infrastructure (VNFM) that facilitates generation and communication of performance measurements related to virtualized resources, according to various aspects described herein. System 1000 can comprise one or more processors 1010 (e.g., which can comprise one or more of processor(s) 210, etc., each of which can comprise processing circuitry and one or more interfaces for send/receive data to/from each other or other circuitry, such as a memory interface to send/receive data to/from memory 1030, a communication circuitry interface to send/receive data to/from communication circuitry 1020, etc.), communication circuitry 1020 (which can facilitate communication of data via one or more reference points, networks, etc., and can comprise communication resource(s) 230, etc.), and memory 1030 (which can comprise any of a variety of storage mediums and can store instructions and/or data associated with at least one of the one or more processors 1010 or communication circuitry 1020, and can comprise memory/storage device(s) 220 and/or cache memory of processor(s) 1010, etc.). In some aspects, the one or more processors 1010, the communication circuitry 1020, and the memory 1030 can be included in a single device, while in other aspects, they can be included in different devices, such as part of a distributed architecture. As described in greater detail below, system 1000 can be employed by a NFVI to facilitate generation and communication of performance measurements related to virtualized resources, in various embodiments.

3GPP Performance Measurements

Figure 11:
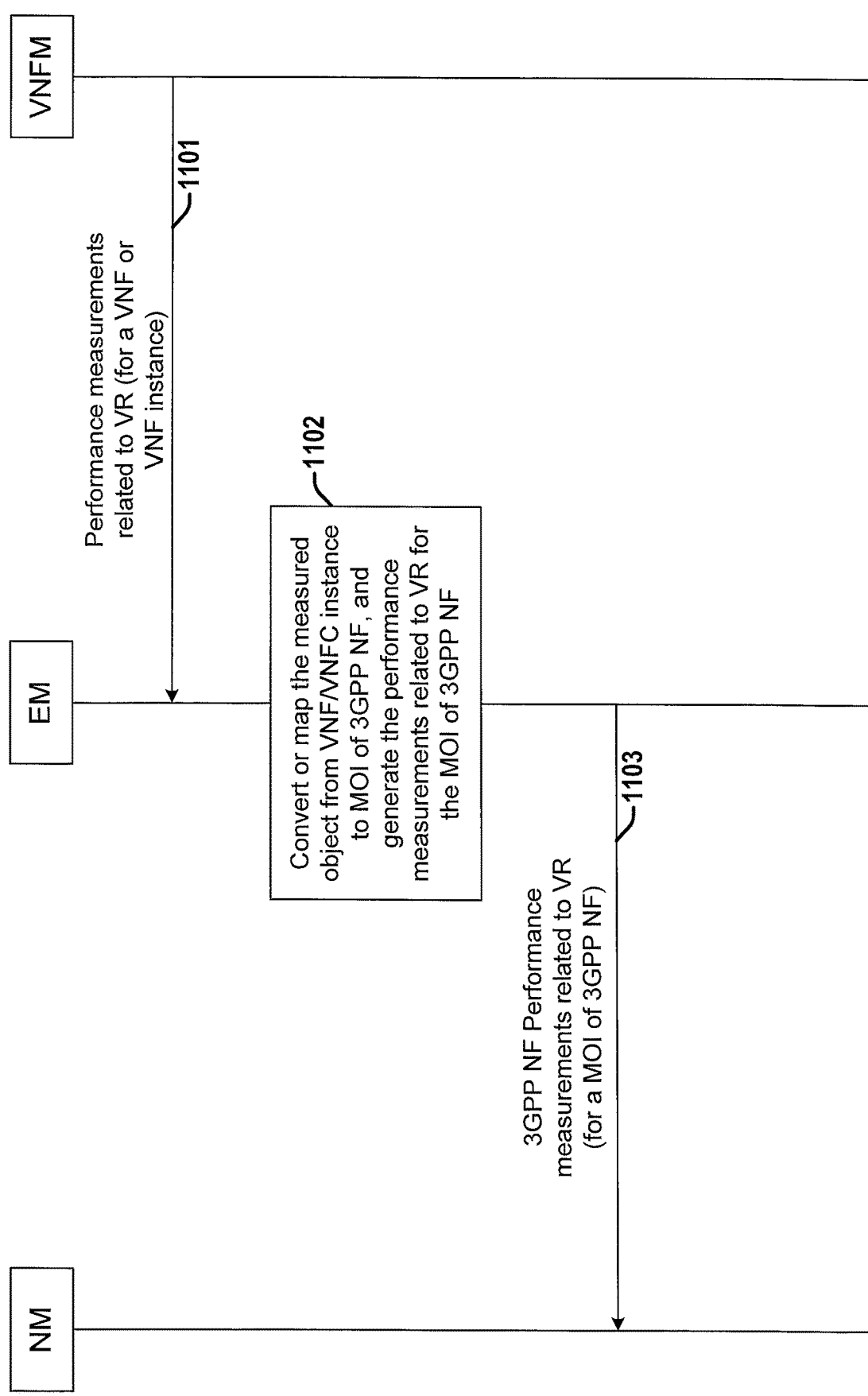
FIG. 11 is a diagram of an example procedure for generating and communicating 3GPP (Third Generation Partnership Project) performance measurements related to virtualized resources, according to various aspects discussed herein.

Referring to FIG. 11, illustrated is a diagram showing an example method that can facilitate collection and communication of 3GPP NR performance measurements related to VR(s), according to various aspects discussed herein.

In FIG. 11, at 1101, an EM (e.g., employing system 600) can receive from a VNFM (e.g., employing system 800) one or more performance measurements related to a VR (e.g., generated by processor(s) 810, transmitted via communication circuitry 820 via reference point Ve-Vnfm-em, received by communication circuitry 620, and processed by processor(s) 610), wherein the performance measurements can be collected for one or more specific VNF or VNFC (VNF Component) instances.

At 1102, the EM can convert or map (e.g., via processor(s) 610) the measured object of the received performance measurement(s) from the VNF/VNFC instance(s) to corresponding MOI(s) (Managed Object Instance(s)) of a 3GPP NF (Network Function, e.g., MME (Mobility Management Entity), CSCF (Call Session Control Function), etc.), and can generate (e.g., via processor(s) 610) the performance measurement(s) related to the VR for the MOI(s) of the 3GPP NF.

At 1103, the EM can report to the NM the performance measurement(s) related to VR with the MOI(s) of 3GPP NF as measured object(s) (e.g., via a report or notification generated by processor(s) 610, output by communication circuitry 620 via the Itf-N reference point, received by communication circuitry 420, and processed by processor(s) 410). By correlating (e.g., via processor(s) 410) the VR related measurement(s) with the performance measurement(s) of the 3GPP NF, the NM can determine (e.g., via processor(s) 410) whether the 3GPP NF performance is impacted by the VR(s). In some scenarios (e.g., when 3GPP NF performance is impacted, or impacted by more than a threshold amount), the NM may take appropriate action to solve the performance issue of the 3GPP NF, for example, to scale in/out the VNF instance(s) that realizes the 3GPP NF, or switch on/off the auto-scaling for the VNF instance(s).

In various aspects, 3GPP performance measurements discussed herein can be generated (e.g., by processor(s) 610, etc.) via Object Mapping (OM). In OM, the non-3GPP defined entity (e.g., NE (e.g., one of NE $320_i$) or management entity) can maintain a measurement based on an "externally defined collection method." Then the 3GPP system can receive the non-3GPP measurement, can map its measured object from the non-3GPP defined MOI to the 3GPP defined MOI for the 3GPP defined entity, and can generate a 3GPP measurement for the 3GPP NF, with or without processing.

In various aspects discussed herein, performance measurements discussed below can be employed as EPC performance measurements or IMS performance measurements related to VR(s), as discussed in greater detail below.

3GPP performance measurements discussed herein in connection with this first set of aspects can conform to the following template for describing performance measurements:

a) Description
   This subclause contains the description of the performance measurement.
b) Collection Method
   This subclause contains the method in which this measurement is obtained.
   Object Mapping (OM): The entity receives a metric for measured object A in the collection period and maps the received metric from measured object A to measured object B. A measurement is generated by processing all of the mapped metric(s) for measured object B.
c) Condition
   This subclause contains the condition which causes the counter to be updated.
d) Measurement Result (measured value(s), Units)
   This subclause contains a description of expected result value(s).
e) Measurement Type
   This subclause contains a short form of the measurement name specified in the header, which is used to identify the measurement type in the result files.
f) Measurement Object Class
   This subclause describes the measured object class(es).
g) Switching Technology
   This subclause contains the Switching domain(s) this measurement is applicable to i.e. Circuit Switched and/or Packet Switched.
h) Generation
   The generation determines if it concerns a GSM, UMTS, EPS, combined (GSM+UMTS+EPS) or EPC or IMS measurement.

Virtualized Resource Related Measurements for EPC NFs

In various aspects, VR related performance measurements for EPC NFs can comprise performance measurements related to one or more of virtual CPU usage (e.g., mean virtual CPU usage, peak virtual CPU usage, etc.), virtual memory usage (e.g., mean virtual memory usage, peak virtual memory usage, etc.), or virtual disk usage (e.g., mean virtual disk usage, peak virtual disk usage, etc.). Any of the following performance measurements can be employed for virtualized EPC NFs.

Mean virtual CPU usage, which can have the following characteristics:
  a) This measurement can provide the mean (e.g., weighted mean, etc.) virtual CPU usage of the underlying Virtual Computes of an EPC NF. This measurement can be split into subcounters per Virtual Compute instance.
  b) OM.
  c) The EM can receive (e.g., via communication circuitry 620) one or more VcpuUsageMeanVnf.vComputeId ((virtual CPU usage mean VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., via processor(s) 610) the measured object from VNF/VNFC instance(s) that can be identified by objectType (object type, which can indicate the object type of the VNF descriptor) and objectInstanceId to the EPC NF MOI(s) (e.g., as specified in f, below) identified by iOCName (information object class (IOC) name, which can specify one Managed Entity class name) and iOCInstanceList (IOC instance list, which can specify the list of DNs of ManagedEntity (managed entity) instances whose measurementType(s) (measurement type(s)) are to be collected). Each subcounter of the VcpuUsageMeanVnf.vComputeId measurement(s) can be mapped (e.g., via processor(s) 610) to the subcounter per Virtual Compute instance for the EPC NF MOI.
  d) Each measurement can be an integer value (Unit: %).
  e) The measurement name can have the form VR.VcpuUsageMean.vComputeId, where vComputeId can be equal to the computeId (compute identifier) of the VirtualCompute (virtual compute) resource.
  f) MMEFunction (Mobility Management Entity Function)
    PGWFunction (Packet Data Network (PDN) GateWay Function)
    ServingGWFunction (Serving GateWay Function)
    MBMSGWFunction (Multimedia Broadcast Multicast Service GateWay Function)
    PCRFFunction (PCRF (Policy and Charging Rules Function)) Function)
  g) Valid for circuit switched and packet switched traffic.
  h) EPC.

Peak virtual CPU usage, which can have the following characteristics:
  a) This measurement can provide the peak virtual CPU usage of the underlying Virtual Computes of an EPC NF. This measurement can be split into subcounters per Virtual Compute instance.
  b) OM.
  c) The EM can receive (e.g., via communication circuitry 620) one or more VcpuUsagePeakVnf.vComputeId ((virtual CPU usage peak VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., via processor(s) 610) the measured object from VNF/VNFC instance(s) that can be identified by objectType and objectInstanceId to the EPC NF MOI(s) (e.g., as specified in f, below) identified by iOCName and iOCInstanceList. Each subcounter of the VcpuUsagePeakVnf.vComputeId measurement(s) can be mapped (e.g., via processor(s) 610) to the subcounter per Virtual Compute instance for the EPC NF MOI.
  d) Each measurement can be an integer value (Unit: %).
  e) The measurement name can have the form VR.VcpuUsagePeak.vComputeId, where vComputeId can be equal to the computeId of the VirtualCompute resource.
  f) MMEFunction
    PGWFunction
    ServingGWFunction
    MBMSGWFunction
    PCRFFunction
  g) Valid for circuit switched and packet switched traffic.
  h) EPC.

Mean virtual memory usage, which can have the following characteristics:
  a) This measurement can provide the mean (e.g., weighted mean, etc.) virtual memory usage of the underlying Virtual Computes of an EPC NF. This measurement can be split into subcounters per Virtual Compute instance.
  b) OM.
  c) EM can receive (e.g., via communication circuitry 620) one or more VmemoryUsageMeanVnf.vComputeId ((virtual memory usage mean VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., via processor(s) 610) the measured object from VNF/VNFC instance(s) that can be identified by objectType and objectInstanceId to the EPC NF MOI(s) (e.g., as specified in f, below) identified by iOCName and iOCInstanceList. Each subcounter of the VmemoryUsageMeanVnf.vComputeId measurement(s) can be mapped (e.g., by processor(s) 610) to the subcounter per Virtual Compute instance for the EPC NF MOI.
  d) Each measurement can be an integer value (Unit: %).
  e) The measurement name can have the form VR.VmemoryUsageMean.vComputeId, where vComputeId can be equal to the computeId of the VirtualCompute resource.
  f) MMEFunction
    PGWFunction
    ServingGWFunction
    MBMSGWFunction
    PCRFFunction
  g) Valid for circuit switched and packet switched traffic.
  h) EPC.

Peak virtual memory usage, which can have the following characteristics:
  a) This measurement can provide the peak virtual memory usage of the underlying Virtual Computes of an EPC NF. This measurement can be split into subcounters per Virtual Compute instance.
  b) OM.
  c) EM can receive (e.g., via communication circuitry 620) one or more VmemoryUsagePeakVnf.vComputeId ((virtual memory usage peak VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., by processor(s) 610) the measured object from VNF/VNFC instance(s) that can be identified by objectType and objectInstanceId to the EPC NF MOI(s) (as specified in f, below)

identified by iOCName and iOCInstanceList. Each subcounter of the VmemoryUsagePeakVnf.vComputeId measurement(s) can be mapped (e.g., by processor(s) 610) to the subcounter per Virtual Compute instance for the EPC NF MOI.
d) Each measurement can be an integer value (Unit: %).
e) The measurement name can have the form VR.VmemoryUsagePeak.vComputeId, where vComputeId can be equal to the computeId of the VirtualCompute resource.
f) MMEFunction
PGWFunction
ServingGWFunction
MBMSGWFunction
PCRFFunction
g) Valid for circuit switched and packet switched traffic.
h) EPC.

Mean virtual disk usage, which can have the following characteristics:
a) This measurement can provide the mean (e.g., weighted mean, etc.) virtual disk usage of the underlying Virtual Compute of an EPC NF. This measurement can be split into subcounters per Virtual Compute instance.
b) OM.
c) EM can receive one or more VdiskUsageMeanVnf.vComputeId ((virtual disk usage mean VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., via processor(s) 610) the measured object from VNF/VNFC instance(s) that can be identified by objectType and objectInstanceId to the EPC NF MOI(s) (e.g., as specified in f, below) identified by iOCName and iOCInstanceList. Each subcounter of the VdiskUsageMeanVnf.vComputeId measurement(s) can be mapped (e.g., by processor(s) 610) to the subcounter per Virtual Compute instance for the EPC NF MOI.
d) Each measurement can be an integer value (Unit: %).
e) The measurement name can have the form VR.VdiskUsageMean.vComputeId where vComputeId can be equal to the computeId of the VirtualCompute resource.
f) MMEFunction
PGWFunction
ServingGWFunction
MBMSGWFunction
PCRFFunction
g) Valid for circuit switched and packet switched traffic.
h) EPC.

Peak virtual disk usage, which can have the following characteristics:
a) This measurement can provide the peak virtual disk usage of the underlying Virtual Computes of an EPC NF. This measurement can be split into subcounters per Virtual Compute instance.
b) OM.
c) EM can receive (e.g., via communication circuitry 620) one or more VdiskUsagePeakVnf.vComputeId ((virtual disk usage peak VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., via processor(s) 610) the measured object from VNF/VNFC instance(s) that can be identified by objectType and objectInstanceId to the EPC NF MOI(s) (e.g., as specified in f, below) identified by iOCName and iOCInstanceList. Each subcounter of the VdiskUsagePeakVnf.vComputeId measurement(s) can be mapped (e.g., by processor(s) 610) to the subcounter per Virtual Compute instance for the EPC NF MOI.
d) Each measurement can be an integer value (Unit: %).
e) The measurement name can have the form VR.VdiskUsagePeak.vComputeId, where vComputeId can be equal to the computeId of the VirtualCompute resource.
f) MMEFunction
PGWFunction
ServingGWFunction
MBMSGWFunction
PCRFFunction
g) Valid for circuit switched and packet switched traffic. EPC.

Virtualized Resource Related Measurements for IMS NFs

In various aspects, VR related performance measurements for IMS NFs can comprise performance measurements related to one or more of virtual CPU usage (e.g., mean virtual CPU usage, peak virtual CPU usage, etc.), virtual memory usage (e.g., mean virtual memory usage, peak virtual memory usage, etc.), or virtual disk usage (e.g., mean virtual disk usage, peak virtual disk usage, etc.). Any of the following performance measurements can be employed for virtualized IMS NFs.

Mean virtual CPU usage, which can have the following characteristics:
a) This measurement can provide the mean (e.g., weighted mean, etc.) virtual CPU usage of the underlying Virtual Computes of an IMS NF. This measurement can be split into subcounters per Virtual Compute instance.
b) OM.
c) The EM can receive (e.g., via communication circuitry 620) one or more VcpuUsageMeanVnf.vComputeId ((virtual CPU usage mean VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., via processor(s) 610) the measured object from VNF/VNFC instance(s) that can be identified by objectType (object type, which can indicate the object type of the VNF descriptor) and objectInstanceId to the IMS NF MOI(s) (e.g., as specified in f, below) identified by iOCName (information object class (IOC) name, which can specify one Managed Entity class name) and iOCInstanceList (IOC instance list, which can specify the list of DNs of ManagedEntity (managed entity) instances whose measurementType(s) (measurement type(s)) are to be collected). Each subcounter of the VcpuUsageMeanVnf.vComputeId measurement(s) can be mapped (e.g., via processor(s) 610) to the subcounter per Virtual Compute instance for the IMS NF MOI.
d) Each measurement can be an integer value (Unit: %).
e) The measurement name can have the form VR.VcpuUsageMean.vComputeId, where vComputeId can be equal to the computeId (compute identifier) of the VirtualCompute (virtual compute) resource.
f) PCSCFFunction (Proxy CSCF (Call Session Control Function) Function)
SCSCFFunction (Serving CSCF Function)
HSSFunction (HSS (Home Subscriber Service) Function)
BGCFFunction (BGCF (Breakout Gateway Control Function) Function)

MGCFFunction (MGCF (Media Gateway Control Function) Function)
MRFCFunction (MRFC (Multimedia Resource Function Controller) Function)
MRFPFunction (MRFP (Multimedia Resource Function Processor) Function)
SLFFunction (SLF (Subscriber Location Function) Function)
ASFunction (AS (Application Server(s) Function)
IBCFFunction (IBCF (Interconnection Border Control Function) Function
g) Valid for circuit switched and packet switched traffic.
h) IMS.

Peak virtual CPU usage, which can have the following characteristics:
a) This measurement can provide the peak virtual CPU usage of the underlying Virtual Computes of an IMS NF. This measurement can be split into subcounters per Virtual Compute instance.
b) OM.
c) The EM can receive (e.g., via communication circuitry 620) one or more VcpuUsagePeakVnf.vComputeId ((virtual CPU usage peak VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., via processor(s) 610) the measured object from VNF/VNFC instance(s) that can be identified by objectType and objectInstanceId to the IMS NF MOI(s) (e.g., as specified in f, below) identified by iOCName and iOCInstanceList. Each subcounter of the VcpuUsagePeakVnf.vComputeId measurement(s) can be mapped (e.g., via processor(s) 610) to the subcounter per Virtual Compute instance for the IMS NF MOI.
d) Each measurement can be an integer value (Unit: %).
e) The measurement name can have the form VR.VcpuUsagePeak.vComputeId, where vComputeId can be equal to the computeId of the VirtualCompute resource.
f) PCSCFFunction
SCSCFFunction
HSSFunction
BGCFFunction
MGCFFunction
MRFCFunction
MRFPFunction
SLFFunction
ASFunction
IBCFFunction
g) Valid for circuit switched and packet switched traffic.
h) IMS.

Mean virtual memory usage, which can have the following characteristics:
a) This measurement can provide the mean (e.g., weighted mean, etc.) virtual memory usage of the underlying Virtual Computes of an IMS NF. This measurement can be split into subcounters per Virtual Compute instance.
b) OM.
c) EM can receive (e.g., via communication circuitry 620) one or more VmemoryUsageMeanVnf.vComputeId ((virtual memory usage mean VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., via processor(s) 610) the measured object from VNF/VNFC instance(s) that can be identified by objectType and objectInstanceId to the IMS NF MOI(s) (e.g., as specified in f, below) identified by iOCName and iOCInstanceList. Each subcounter of the VmemoryUsageMeanVnf.vComputeId measurement(s) can be mapped (e.g., by processor(s) 610) to the subcounter per Virtual Compute instance for the IMS NF MOI.
d) Each measurement can be an integer value (Unit: %).
e) The measurement name can have the form VR.VmemoryUsageMean.vComputeId, where vComputeId can be equal to the computeId of the VirtualCompute resource.
f) PCSCFFunction
SCSCFFunction
HSSFunction
BGCFFunction
MGCFFunction
MRFCFunction
MRFPFunction
SLFFunction
ASFunction
IBCFFunction
g) Valid for circuit switched and packet switched traffic.
h) IMS.

Peak virtual memory usage, which can have the following characteristics:
a) This measurement can provide the peak virtual memory usage of the underlying Virtual Computes of an IMS NF. This measurement can be split into subcounters per Virtual Compute instance.
b) OM.
c) EM can receive (e.g., via communication circuitry 620) one or more VmemoryUsagePeakVnf.vComputeId ((virtual memory usage peak VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., by processor(s) 610) the measured object from VNF/VNFC instance(s) that can be identified by objectType and objectInstanceId to the IMS NF MOI(s) (as specified in f, below) identified by iOCName and iOCInstanceList. Each subcounter of the VmemoryUsagePeakVnf.vComputeId measurement(s) can be mapped (e.g., by processor(s) 610) to the subcounter per Virtual Compute instance for the IMS NF MOI.
d) Each measurement can be an integer value (Unit: %).
e) The measurement name can have the form VR.VmemoryUsagePeak.vComputeId, where vComputeId can be equal to the computeId of the VirtualCompute resource.
f) M PCSCFFunction
SCSCFFunction
HSSFunction
BGCFFunction
MGCFFunction
MRFCFunction
MRFPFunction
SLFFunction
ASFunction
IBCFFunction
g) Valid for circuit switched and packet switched traffic.
h) IMS.

Mean virtual disk usage, which can have the following characteristics:

a) This measurement can provide the mean (e.g., weighted mean, etc.) virtual disk usage of the underlying Virtual Compute of an IMS NF. This measurement can be split into subcounters per Virtual Compute instance.
b) OM.
c) EM can receive one or more VdiskUsageMeanVnf.vComputeId ((virtual disk usage mean VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., via processor(s) 610) the measured object from VNF/VNFC instance(s) that can be identified by objectType and objectInstanceId to the IMS NF MOI(s) (e.g., as specified in f, below) identified by iOCName and iOCInstanceList. Each subcounter of the VdiskUsageMeanVnf.vComputeId measurement(s) can be mapped (e.g., by processor(s) 610) to the subcounter per Virtual Compute instance for the IMS NF MOI.
d) Each measurement can be an integer value (Unit: %).
e) The measurement name can have the form VR.VdiskUsageMean.vComputeId where vComputeId can be equal to the computeId of the VirtualCompute resource.
f) PCSCFFunction
SCSCFFunction
HSSFunction
BGCFFunction
MGCFFunction
MRFCFunction
MRFPFunction
SLFFunction
ASFunction
IBCFFunction
g) Valid for circuit switched and packet switched traffic.
h) IMS.

Peak virtual disk usage, which can have the following characteristics:
a) This measurement can provide the peak virtual disk usage of the underlying Virtual Computes of an IMS NF. This measurement can be split into subcounters per Virtual Compute instance.
b) OM.
c) EM can receive (e.g., via communication circuitry 620) one or more VdiskUsagePeakVnf.vComputeId ((virtual disk usage peak VNF).(virtual compute identifier)) measurement(s) for the VNF/VNFC instance(s) from VNFM (e.g., generated by processor(s) 810 and sent via communication circuitry 820 via the Ve-Vnfm-em reference point) in the collection period(s), and can map (e.g., via processor(s) 610) the measured object from VNF/VNFC instance(s) that can be identified by objectType and objectInstanceId to the IMS NF MOI(s) (e.g., as specified in f, below) identified by iOCName and iOCInstanceList. Each subcounter of the VdiskUsagePeakVnf.vComputeId measurement(s) can be mapped (e.g., by processor(s) 610) to the subcounter per Virtual Compute instance for the IMS NF MOI.
d) Each measurement can be an integer value (Unit: %).
e) The measurement name can have the form VR.VdiskUsagePeak.vComputeId, where vComputeId can be equal to the computeId of the VirtualCompute resource.
f) PCSCFFunction
SCSCFFunction
HSSFunction
BGCFFunction
MGCFFunction
MRFCFunction
MRFPFunction
SLFFunction
ASFunction
IBCFFunction
g) Valid for circuit switched and packet switched traffic.
h) IMS.

Performance Measurements Related to VR

In accordance with a second set of aspects described herein, the performance measurements related to VR can be collected as described below for each reference point.

Ve-Vnfm-em

Figure 12:
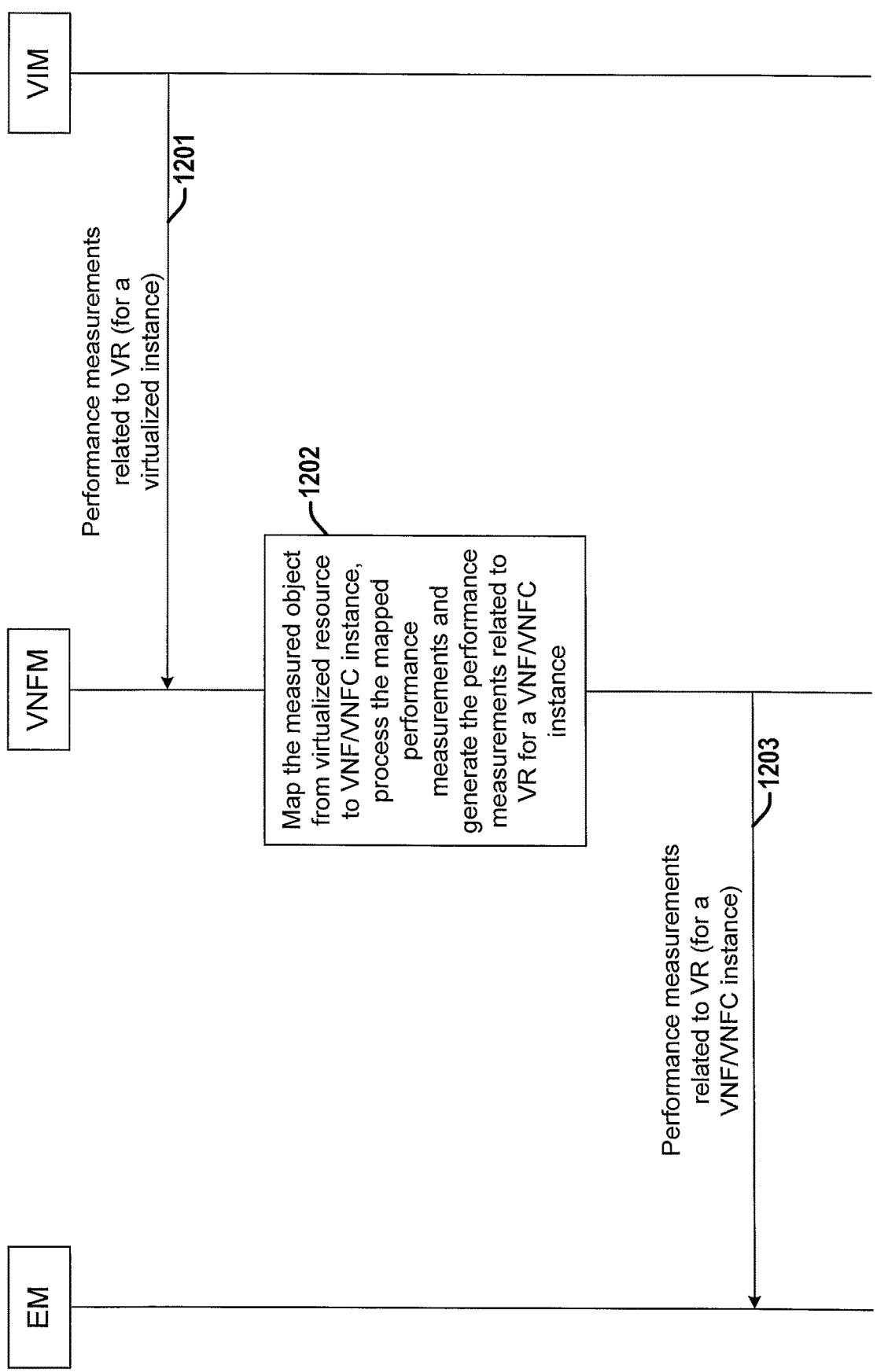
FIG. 12 is a diagram of an example procedure for generating and communicating performance measurements related to virtualized resources for a Ve-Vnfm-em reference point, according to various aspects discussed herein.

Referring to FIG. 12, illustrated is a diagram showing an example method that can facilitate collection and communication of performance measurements related to VR(s) for the Ve-Vnfm-em reference point, according to various aspects discussed herein.

At 1201, the VNFM can receive (e.g., via communication circuitry 820) one or more performance measurements related to VR from VIM (e.g., generated by processor(s) 910, sent via communication circuitry 920 over the Vi-Vnfm reference point, received by communication circuitry 820, and processed by processor(s) 810), wherein the performance measurement(s) can be collected for specific virtualized resource instance(s).

At 1202, the VNFM can map (e.g., via processor(s) 810) the measured object(s) of the received performance measurement(s) from virtualized resource(s) to VNF/VNFC instance(s). The VNFM can process (e.g., via processor(s) 810) the mapped performance measurements. In one example, such processing comprises assigning the performance value(s) of the received performance measurement(s) related to VR for a VNF/VNFC instance. The VNFM can generate (e.g., via processor(s) 810) the performance measurements related to VR for a VNF/VNFC instance.

At 1203, the VNFM can report to the EM (e.g., via a report generated by processor(s) 810, sent via communication circuitry 820 over the Ve-Vnfm-em reference point, received via communication circuitry 620, and processed by processor(s) 610).

Or-Vnfm

Figure 13:
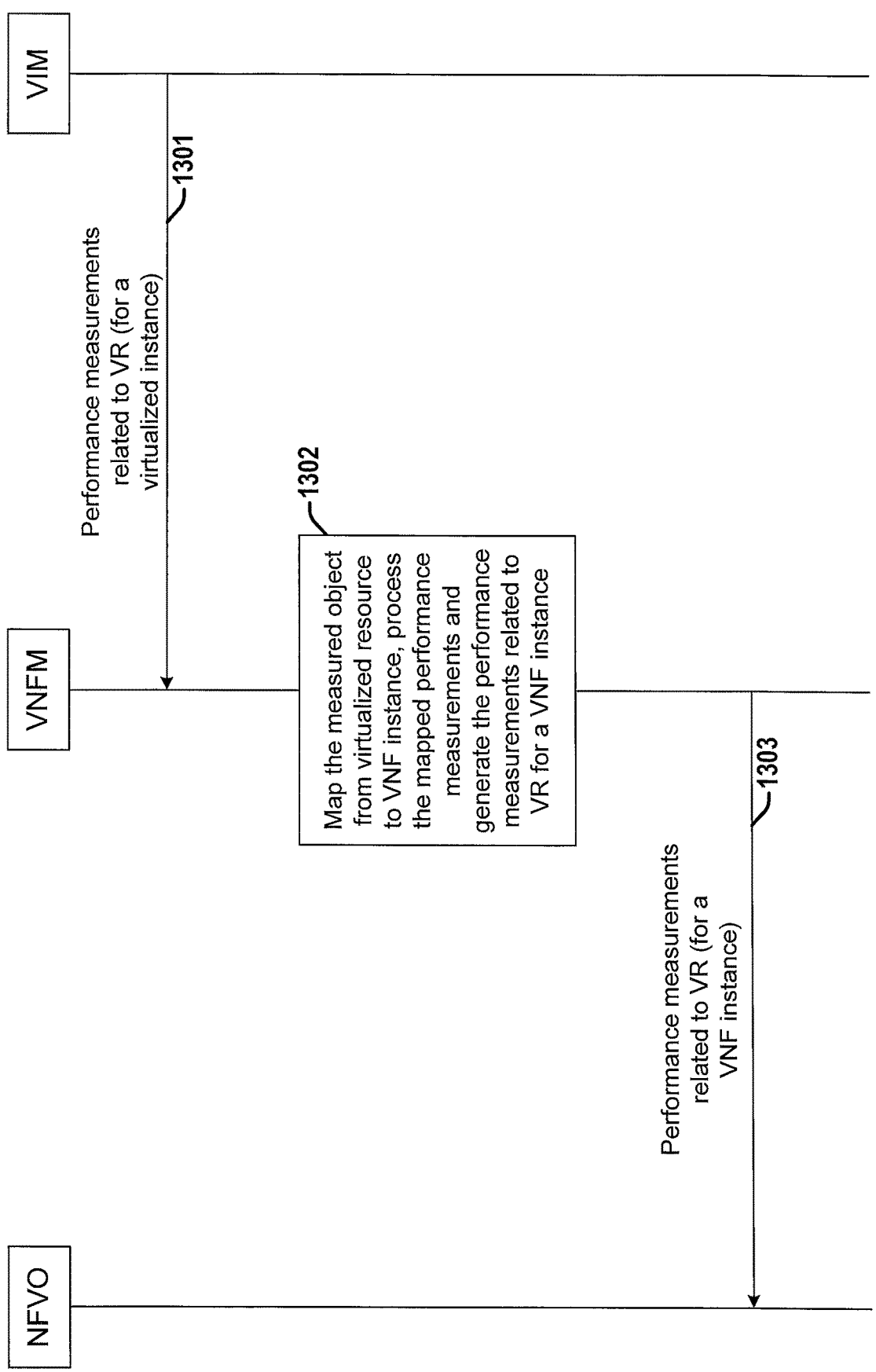
FIG. 13 is a diagram of an example procedure for generating and communicating performance measurements related to virtualized resources for a Or-Vnfm reference point, according to various aspects discussed herein.

Referring to FIG. 13, illustrated is a diagram showing an example method that can facilitate collection and communication of performance measurements related to VR(s) for the Or-Vnfm reference point, according to various aspects discussed herein.

At 1301, the VNFM can receive (e.g., via communication circuitry 820) one or more performance measurements related to VR from a VIM (e.g., generated by processor(s) 910, sent via communication circuitry 920 over the Vi-Vnfm reference point, received via communication circuitry 820, and processed via processor(s) 810), wherein the performance measurement(s) can be collected for specific virtualized resource instance(s).

At 1302, the VNFM can map (e.g., via processor(s) 810) the measured object(s) of the received performance measurement(s) from virtualized resource(s) (e.g., virtualized compute resource(s)) to VNF instance(s). The VNFM can process (e.g., via processor(s) 810) the mapped performance measurements. In one example, such processing comprises assigning the performance value(s) of the received performance measurement(s) to sub-counter(s) of the performance measurement(s) related to VR for a VNF instance. The VNFM can generate (e.g., via processor(s) 810) the performance measurement(s) related to VR for one or more VNF instances.

At 1303, the VNFM can report to the NFVO (e.g., via a report generated by processor(s) 810, sent via communication circuitry 820 over the Or-Vnfm reference point, received via communication circuitry 720, and processed by processor(s) 710) the performance measurement(s) related to the VR with the VNF instance(s) as measured object(s).

Or-Vi

Figure 14:
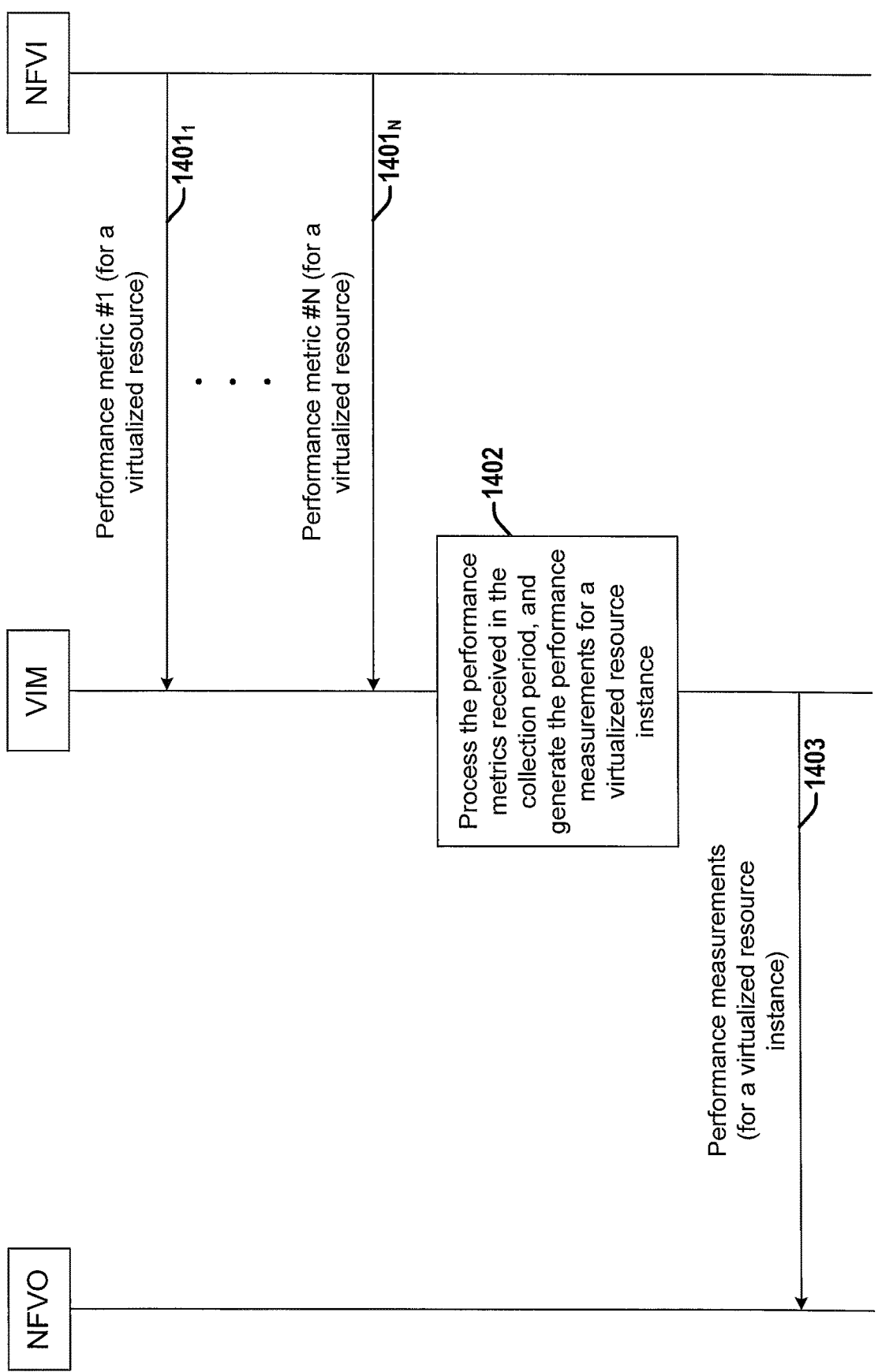
FIG. 14 is a diagram of an example procedure for generating and communicating performance measurements related to virtualized resources for an Or-Vi reference point, according to various aspects discussed herein.

Referring to FIG. 14, illustrated is a diagram showing an example method that can facilitate collection and communication of performance measurements related to VR(s) for the Or-Vi reference point, according to various aspects discussed herein.

At 1401, a VIM can receive (e.g., via communication circuitry 920) one or more performance metrics from a NFVI (e.g., generated by processor(s) 1010, sent via communication circuitry 1020 over the Nf-Vi reference point, received via communication circuitry 920, and processed by processor(s) 910) at a pre-defined interval, wherein the performance measurement(s) can be collected for specific virtualized resource instance(s).

At 1402, the VIM can process (e.g., via processor(s) 910) the performance metric(s) received via all of the intervals within the collection period(s). In one example, such processing comprises taking the arithmetic mean (e.g., which can be a weighted mean, etc.), or a peak value, etc. The VIM can generate (e.g., via processor(s) 910) the performance measurement(s) for the virtualized resource instance(s).

At 1403, the VIM can report to a NFVO the performance measurement(s) for the virtualized resource instance(s) (e.g., via a report generated by processor(s) 910, sent via communication circuitry 920 over the Or-Vi reference point, received via communication circuitry 720, and processed by processor(s) 710).

Os-Mo-nfvo

Figure 15:
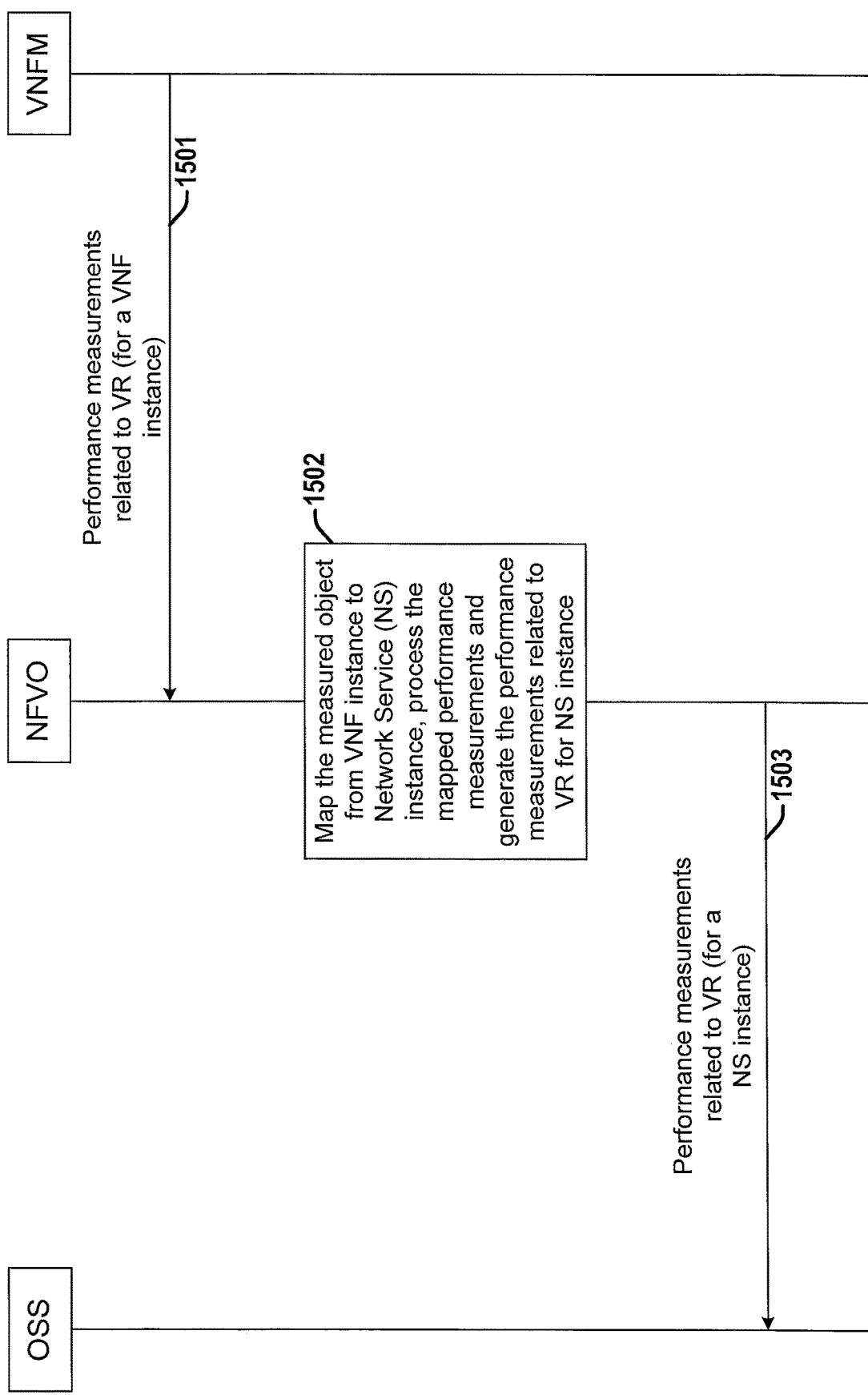
FIG. 15 is a diagram of a first example procedure for generating and communicating performance measurements related to virtualized resources for an Os-Ma-nfvo reference point, according to various aspects discussed herein.

Referring to FIG. 15, illustrated is a diagram showing a first example method that can facilitate collection and communication of performance measurements related to VR(s) for the Os-Mo-nfvi reference point, according to various aspects discussed herein.

At 1501, the NFVO can receive (e.g., via communication circuitry 720) one or more performance measurements related to VR from a VNFM (e.g., generated by processor(s) 810, sent via communication circuitry 820 over the Or-Vnfm reference point, received via communication circuitry 720, and processed by processor(s) 710), wherein the performance measurement(s) can be collected for specific VNF instance(s).

At 1502, the NFVO can map (e.g., via processor(s) 710) the measured object of the received performance measurement(s) from the VNF instance(s) to Network Service (NS) instance(s). The NFVO can process the mapped performance measurement(s). In one example, such processing comprises assigning the performance value of the received performance measurement(s) to sub-counter(s) of the performance measurement(s) related to VR for a NS instance. The NFVO can generate (e.g., via processor(s) 710) the performance measurement(s) related to VR for NS instance(s).

At 1503, the NFVO can report to the OSS the performance measurements related to VR with the NS instance as measured object(s).

Figure 16:
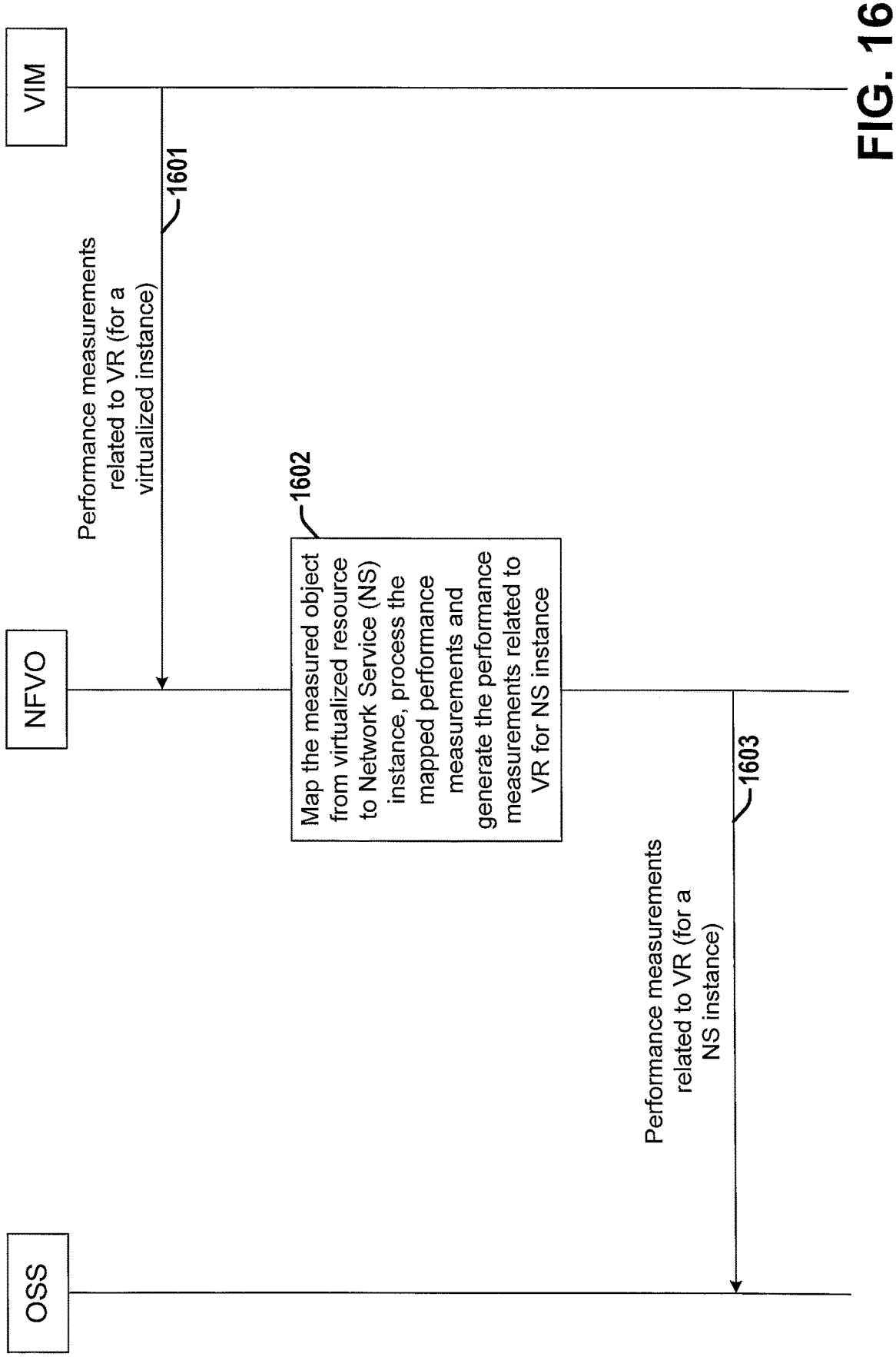
FIG. 16 is a diagram of an example procedure for a first example procedure for generating and communicating performance measurements related to virtualized resources for an Os-Ma-nfvo reference point, according to various aspects discussed herein.

Referring to FIG. 16, illustrated is a diagram showing a second example method that can facilitate collection and communication of performance measurements related to VR(s) for the Os-Mo-nfvi reference point, according to various aspects discussed herein.

At 1601, the NFVO can receive (e.g., via communication circuitry 720) one or more performance measurements related to VR from a VIM (e.g., generated by processor(s) 910, sent via communication circuitry 920 over the Or-Vi reference point, received via communication circuitry 720, and processed by processor(s) 710), wherein the performance measurement(s) can be collected for specific virtualized resource instance(s).

At 1602, the NFVO can map (e.g., via processor(s) 710) the measured object(s) of the received performance measurement(s) from virtualized resource(s) to Network Service (NS) instance(s). The NFVO can process (e.g., via processor(s) 710) the mapped performance measurement(s). In one example, such processing comprises assigning the performance value(s) of the received performance measurement(s) to sub-counter(s) of the performance measurement(s) related to VR for NS instance(s). The NFVO can generate (e.g., via processor(s) 710) the performance measurement(s) related to VR for NS instance(s).

At 1603, the NFVO can report to the OSS the performance measurement(s) related to VR with the NS instance(s) as measured object(s) (e.g., via a report generated by processor(s) 710, sent via communication circuitry 720 over the Os-Ma-nfvo reference point, received via communication circuitry 520, and processed by processor(s) 510).

Performance measurements discussed herein in connection with this second set of aspects can conform to the following template for describing performance measurements:

a) Description

This subclause contains the description of the performance measurement.

b) Collection Method

This subclause contains the method in which this measurement is obtained.

Status Counter (SC): The entity receives a metric at each predetermined interval. A measurement is generated from processing (e.g., arithmetic mean, peak) all of the samples received in the collection period.

Transparent Forwarding (TF): The entity maintains a measurement count that stores the content of the metric that it received.

Object Mapping (OM): The entity receives a metric for measured object A in the collection period and maps the received metric from measured object A to measured object B. A measurement is generated by processing all of the mapped metric(s) for measured object B.

c) Trigger

This subclause contains the trigger which causes the counter to be updated.

d) Measurement Unit

This subclause contains the unit of the measurement value.

e) Measurement Group

This subclause contains the group to which a measurement belongs.

f) Measured Object Type

This subclause describes the object of a measurement.

g) Measurement Name

This subclause describes the name of a measurement. The measurement name is used to identify a measurement. In case the sub-counter is used, the measurement is identified by <measurement type>.<sub-counter name>.

The measurement name is used to identify the performanceMetric in the performance report.

In the create PM Job operation, the measurement type is the content of performanceMetric to identify the type of measurement(s) to be collected. The PM Job is applicable to the sub-counters, if the measurement contains sub-counters.

Examples of measurement names without sub-counters are:
VcpuUsageMean
VcpuUsagePeak Examples of valid measurement names with sub-counters are:
VcpuUsageMeanVnf.vCompute1,
   wherein the "vCompute1" is the value of computeId of the VirtualCompute Instance.
VcpuUsageMeanVnf.vCompute2,
   wherein the "vCompute2" is the value of computeId of the VirtualCompute Instance.

Performance Measurement Definitions

In various aspects, VR related performance measurements for various reference points can comprise performance measurements related to one or more of virtual CPU usage (e.g., mean virtual CPU usage, peak virtual CPU usage, etc.), virtual memory usage (e.g., mean virtual memory usage, peak virtual memory usage, etc.), virtual disk usage (e.g., mean virtual disk usage, peak virtual disk usage, etc.), number of bytes (e.g., number of incoming bytes, number of outgoing bytes, etc.), number of packets (e.g., number of incoming packets, number of outgoing packets, etc.). Any of the following performance measurements can be employed in connection with the associated reference point.

For Ve-Vnfm-em Reference Point

Mean virtual CPU usage of VNF/VNFC instance, which can have the following characteristics:
  a) Description: This measurement can provide the mean (e.g., weighted mean, etc.) virtual CPU usage of the underlying Virtual Computes of a VNF/VNFC instance. This measurement can be split into sub-counters per Virtual Compute instance.
  b) Collection Method: OM
  c) Trigger: the VNFM can receive (e.g., via communication circuitry 820) one or more VcpuUsageMean measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VcpuUsageMean measurement(s) from VirtualCompute instance(s) to the VNF/VNFC instance(s) identified by objectType and objectInstanceId. The VNFM can generate (e.g., via processor(s) 810) the measurement for the subject VNF/VNFC instance(s) by assigning the performanceValue of the VcpuUsageMean measurement(s) to the sub-counter(s) per VirtualCompute instance.
  d) Measurement Unit: Each sub-counter of the measurement can be a real value indicating the percentage of the virtual CPU resources that are used.
  e) Measurement Group: Vi rtualisedComputeResource
  f) Measured Object Type: objectType is Vnf or Vnfc, objectInstanceId can be equal to the vnfInstanceId of the measured Vnf instance or the vnfcId of the measured Vnfc instance.
  g) Measurement Name: VcpuUsageMeanVnf.vComputeId, where vComputeId can be equal to the computeId of the VirtualCompute resource.

Peak virtual CPU usage of VNF/VNFC instance, which can have the following characteristics:
  a) Description: This measurement can provide the peak virtual CPU usage of the underlying Virtual Computes of a VNF/VNFC instance. This measurement can be split into sub-counters per Virtual Compute instance.
  b) Collection Method: OM
  c) Trigger: the VNFM can receive (e.g., via communication circuitry 820) one or more VcpuUsagePeak measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VcpuUsagePeak measurement(s) from VirtualCompute instance to the VNF/VNFC instance identified by objectType and objectInstanceId. The VNFM can generate (e.g., via processor(s) 810) the measurement for the subject VNF/VNFC instance by assigning the performanceValue of the VcpuUsagePeak measurement(s) to the sub-counter(s) per VirtualCompute instance.
  d) Measurement Unit: Each sub-counter of the measurement can be a real value indicating the percentage of the virtual CPU resources that are used.
  e) Measurement Group: VirtualisedComputeResource
  f) Measured Object Type: objectType is Vnf or Vnfc, objectInstanceId can be equal to the vnfInstanceId of the measured Vnf instance or the vnfcId of the measured Vnfc instance.
  g) Measurement Name: VcpuUsagePeakVnf.vComputeId, where vComputeId can be equal to the computeId of the VirtualCompute resource.

Mean memory usage of VNF/VNFC instance, which can have the following characteristics:
  a) Description: This measurement can provide the mean (e.g., weighted mean, etc.) memory usage of the underlying Virtual Computes of a VNF/VNFC instance. This measurement can be split into sub-counters per Virtual Compute instance.
  b) Collection Method: OM
  c) Trigger: the VNFM can receive (e.g., via communication circuitry 820) one or more VmemoryUsageMean measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VmemoryUsageMean measurement(s) from VirtualCompute instance(s) to the VNF/VNFC instance(s) identified by objectType and objectInstanceId. The VNFM can generate (e.g., via processor(s) 810) the measurement for the subject VNF/VNFC instance(s) by assigning the performanceValue of the VmemoryUsageMean measurement(s) to the sub-counter(s) per VirtualCompute instance.
  d) Measurement Unit: Each sub-counter of the measurement can be a real value indicating the percentage of the memory resources that are used.
  e) Measurement Group: VirtualisedComputeResource
  f) Measured Object Type: objectType is Vnf or Vnfc, objectInstanceId can be equal to the vnfInstanceId of the measured Vnf instance or the vnfcId of the measured Vnfc instance.
  g) Measurement Name: VmemoryUsageMeanVnf.vComputeId, where vComputeId can be equal to the computeId of the VirtualCompute resource.

Peak memory usage of VNF/VNFC instance, which can have the following characteristics:
- a) Description: This measurement can provide the peak memory usage of the underlying Virtual Computes of a VNF/VNFC instance. This measurement can be split into sub-counters per Virtual Compute instance.
- b) Collection Method: OM
- c) Trigger: the VNFM can receive (e.g., via communication circuitry 820) one or more VmemoryUsagePeak measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VmemoryUsagePeak measurement(s) from VirtualCompute instance(s) to the VNF/VNFC instance(s) identified by objectType and objectInstanceId. The VNFM can generate (e.g., via processor(s) 810) the measurement for the subject VNF/VNFC instance(s) by assigning the performanceValue of the VmemoryUsagePeak measurement(s) to the sub-counter(s) per VirtualCompute instance.
- d) Measurement Unit: Each sub-counter of the measurement can be a real value indicating the percentage of the memory resources that are used.
- e) Measurement Group: Vi rtualisedComputeResource
- f) Measured Object Type: objectType is Vnf or Vnfc, objectInstanceId can be equal to the vnfInstanceId of the measured Vnf instance or the vnfcId of the measured Vnfc instance.
- g) Measurement Name: VmemoryUsagePeakVnf.vComputeId, where vComputeId can be equal to the computeId of the VirtualCompute resource.

Mean disk usage of VNF/VNFC instance, which can have the following characteristics:
- a) Description: This measurement can provide the mean (e.g., weighted mean, etc.) disk usage of the underlying Virtual Computes of a VNF/VNFC instance. This measurement can be split into sub-counters per Virtual Compute instance.
- b) Collection Method: OM
- c) Trigger: the VNFM can receive (e.g., via communication circuitry 820) one or more VdiskUsageMean measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VdiskUsageMean measurement(s) from VirtualCompute instance(s) to the VNF/VNFC instance(s) identified by objectType and objectInstanceId. The VNFM can generate (e.g., via processor(s) 810) the measurement for the subject VNF/VNFC instance(s) by assigning the performanceValue of the VdiskUsageMean measurement(s) to the sub-counter(s) per VirtualCompute instance.
- d) Measurement Unit: Each sub-counter of the measurement can be a real value indicating the percentage of the memory resources that are used.
- e) Measurement Group: VirtualisedComputeResource
- f) Measured Object Type: objectType is Vnf or Vnfc, objectInstanceId can be equal to the vnfInstanceId of an instantiated Vnf instance or the vnfcId of a VNFC instance.
- g) Measurement Name: VdiskUsagePeakVnf.vStorageId, where vStorageId can be equal to the StorageId of the VirtualStorage resource.

Peak disk usage of VNF/VNFC instance, which can have the following characteristics:
- a) Description: This measurement can provide the peak disk usage of the underlying Virtual Computes of a VNF/VNFC instance. This measurement can be split into sub-counters per Virtual Compute instance.
- b) Collection Method: OM
- c) Trigger: the VNFM can receive (e.g., via communication circuitry 820) one or more VdiskUsagePeak measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VdiskUsagePeak measurement(s) from VirtualCompute instance(s) to the VNF/VNFC instance(s) identified by objectType and objectInstanceId. The VNFM can generate (e.g., via processor(s) 810) the measurement for the subject VNF/VNFC instance(s) by assigning the performanceValue of the VdiskUsagePeak measurement(s) to the sub-counter(s) per VirtualCompute instance.
- d) Measurement Unit: Each sub-counter of the measurement can be a real value indicating the percentage of the memory resources that are used.
- e) Measurement Group: VirtualisedComputeResource
- f) Measured Object Type: objectType is Vnf or Vnfc, objectInstanceId can be equal to the vnfInstanceId of an instantiated Vnf instance or the vnfcId of a VNFC instance.
- g) Measurement Name: VdiskUsagePeakVnf.vStorageId, where vStorageId can be equal to the StorageId of the VirtualStorage resource.

Number of incoming bytes of VNF/VNFC instance, which can have the following characteristics:
- a) Description: This measurement can provide the number of bytes received by the virtual network interfaces under the instantiated compute resource(s) of a VNF/VNFC instance. This measurement can be split into sub-counters per virtual network interface.
- b) Collection Method: OM
- c) Trigger: the VNFM can receive (e.g., via communication circuitry 820) one or more VnetByteIncoming measurement(s) for the VirtualNetworkInterface instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VnetByteIncoming measurement(s) from VirtualNetworkInterface instance(s) to the VNF/VNFC instance(s) identified by objectType and objectInstanceId. The VNFM can generate (e.g., via processor(s) 810) the measurement for the subject VNF/VNFC instance(s) by assigning the performanceValue of the VnetByteIncoming measurement(s) to the sub-counter(s) per VirtualNetworkInterface instance.
- d) Measurement Unit: Each sub-counter of the measurement can be a real value.
- e) Measurement Group: VirtualNetworkInterface
- f) Measured Object Type: objectType is Vnf or Vnfc, objectInstanceId can be equal to the vnfInstanceId of the measured Vnf instance or the vnfcId of the measured Vnfc instance.

g) Measurement Name: VnetByteIncomingVnf.VnetItfId, where VnetItfId can be equal to the resourceId of the virtual network interface.

Number of outgoing bytes of VNF/VNFC instance, which can have the following characteristics:
- a) Description: This measurement can provide the number of bytes transmitted by the virtual network interfaces under the instantiated compute resource(s) of a VNF/VNFC instance. This measurement can be split into sub-counters per virtual network interface.
- b) Collection Method: OM
- c) Trigger: the VNFM can receive (e.g., via communication circuitry 820) one or more VnetByteOutgoing measurement(s) for the VirtualNetworkInterface instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VnetByteOutgoing measurement(s) from VirtualNetworkInterface instance(s) to the VNF/VNFC instance(s) identified by objectType and objectInstanceId. The VNFM can generate (e.g., via processor(s) 810) the measurement for the subject VNF/VNFC instance(s) by assigning the performanceValue of the VnetByteOutgoing measurement(s) to the sub-counter(s) per VirtualNetworkInterface instance.
- d) Measurement Unit: Each sub-counter of the measurement can be a real value.
- e) Measurement Group: VirtualNetworkInterface
- f) Measured Object Type: objectType is Vnf or Vnfc, objectInstanceId can be equal to the vnfInstanceId of the measured Vnf instance or the vnfcId of the measured Vnfc instance.
- g) Measurement Name: VnetByteOutgoingVnf.VnetItfId, where VnetItfId can be equal to the resourceId of the virtual network interface.

Number of incoming packets of VNF/VNFC instance, which can have the following characteristics:
- a) Description: This measurement can provide the number of packets received by the virtual network interfaces under the instantiated compute resource(s) of a VNF/VNFC instance. This measurement can be split into sub-counters per virtual network interface.
- b) Collection Method: OM
- c) Trigger: the VNFM can receive (e.g., via communication circuitry 820) one or more VnetPacketIncoming measurement(s) for the VirtualNetworkInterface instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VnetPacketIncoming measurement(s) from VirtualNetworkInterface instance(s) to the VNF/VNFC instance(s) identified by objectType and objectInstanceId. The VNFM can generate (e.g., via processor(s) 810) the measurement for the subject VNF/VNFC instance(s) by assigning the performanceValue of the VnetPacketIncoming measurement(s) to the sub-counter(s) per VirtualNetworkInterface instance.
- d) Measurement Unit: Each sub-counter of the measurement can be a real value.
- e) Measurement Group: VirtualNetworkInterface
- f) Measured Object Type: objectType is Vnf or Vnfc, objectInstanceId can be equal to the vnfInstanceId of the measured Vnf instance or the vnfcId of the measured Vnfc instance.
- g) Measurement Name: VnetPacketIncomingVnf.VnetItfId, where VnetItfId can be equal to the resourceId of the virtual network interface.

Number of outgoing packets of VNF/VNFC instance, which can have the following characteristics:
- a) Description: This measurement can provide the number of packets transmitted by the virtual network interfaces under the instantiated compute resource(s) of a VNF/VNFC instance. This measurement can be split into sub-counters per virtual network interface.
- b) Collection Method: OM
- c) Trigger: the VNFM can receive (e.g., via communication circuitry 820) one or more VnetPacketOutgoing measurement(s) for the VirtualNetworkInterface instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VnetPacketOutgoing measurement(s) from VirtualNetworkInterface instance(s) to the VNF/VNFC instance(s) identified by objectType and objectInstanceId. The VNFM can generate (e.g., via processor(s) 810) the measurement for the subject VNF/VNFC instance(s) by assigning the performanceValue of the VnetPacketOutgoing measurement(s) to the sub-counter(s) per VirtualNetworkInterface instance.
- d) Measurement Unit: Each sub-counter of the measurement can be a real value.
- e) Measurement Group: VirtualNetworkInterface
- f) Measured Object Type: objectType is Vnf or Vnfc, objectInstanceId can be equal to the vnfInstanceId of the measured Vnf instance or the vnfcId of the measured Vnfc instance.
- g) Measurement Name: VnetPacketOutgoingVnf.VnetItfId, where VnetItfId can be equal to the resourceId of the virtual network interface.

For Or-Vnfm Reference Point

Mean virtual CPU usage of VNF instance, which can have the following characteristics:
- a) Description: This measurement can provide the mean (e.g., weighted mean, etc.) virtual CPU usage of the underlying Virtual Computes of a VNF instance. This measurement can be split into sub-counters per Virtual Compute instance.
- b) Collection Method: OM
- c) Trigger: the VNFM can receive (e.g., via communication circuitry 820) one or more VcpuUsageMean measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VcpuUsageMean measurement(s) from VirtualCompute instance(s) to the VNF instance(s) identified by objectType and objectInstanceId. The VNFM can generate (e.g., via processor(s) 810) the measurement for the subject VNF instance(s) by assigning the performanceValue of the VcpuUsageMean measurement(s) to the sub-counter(s) per VirtualCompute instance.

d) Measurement Unit: Each sub-counter of the measurement can be a real value indicating the percentage of the virtual CPU resources that are used.
e) Measurement Group: VirtualisedComputeResource
f) Measured Object Type: objectType is Vnf, objectInstanceId can be equal to the vnfInstanceId of the measured Vnf instance.
g) Measurement Name: VcpuUsageMeanVnf.vComputeId, where vComputeId can be equal to the computeId of the VirtualCompute resource.

Peak virtual CPU usage of VNF instance, which can have the following characteristics:
  a) Description: This measurement can provide the peak virtual CPU usage of the underlying Virtual Computes of a VNF instance. This measurement can be split into sub-counters per Virtual Compute instance.
  b) Collection Method: OM
  c) Trigger: the VNFM can receive (e.g., via communication circuitry 820) one or more VcpuUsagePeak measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VcpuUsagePeak measurement(s) from VirtualCompute instance to the VNF instance identified by objectType and objectInstanceId. The VNFM can generate (e.g., via processor(s) 810) the measurement for the subject VNF instance by assigning the performanceValue of the VcpuUsagePeak measurement(s) to the sub-counter(s) per VirtualCompute instance.
  d) Measurement Unit: Each sub-counter of the measurement can be a real value indicating the percentage of the virtual CPU resources that are used.
  e) Measurement Group: VirtualisedComputeResource
  f) Measured Object Type: objectType is Vnf, objectInstanceId can be equal to the vnfInstanceId of the measured Vnf instance.
  g) Measurement Name: VcpuUsagePeakVnf.vComputeId, where vComputeId can be equal to the computeId of the VirtualCompute resource.

Mean memory usage of VNF instance, which can have the following characteristics:
  a) Description: This measurement can provide the mean (e.g., weighted mean, etc.) memory usage of the underlying Virtual Computes of a VNF instance. This measurement can be split into sub-counters per Virtual Compute instance.
  b) Collection Method: OM
  c) Trigger: the VNFM can receive (e.g., via communication circuitry 820) one or more VmemoryUsageMean measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VmemoryUsageMean measurement(s) from VirtualCompute instance(s) to the VNF instance(s) identified by objectType and objectInstanceId. The VNFM can generate (e.g., via processor(s) 810) the measurement for the subject VNF instance(s) by assigning the performanceValue of the VmemoryUsageMean measurement(s) to the sub-counter(s) per VirtualCompute instance.
  d) Measurement Unit: Each sub-counter of the measurement can be a real value indicating the percentage of the memory resources that are used.
  e) Measurement Group: VirtualisedComputeResource
  f) Measured Object Type: objectType is Vnf, objectInstanceId can be equal to the vnfInstanceId of the measured Vnf instance.
  g) Measurement Name: VmemoryUsageMeanVnf.vComputeId, where vComputeId can be equal to the computeId of the VirtualCompute resource.

Peak memory usage of VNF instance, which can have the following characteristics:
  a) Description: This measurement can provide the peak memory usage of the underlying Virtual Computes of a VNF instance. This measurement can be split into sub-counters per Virtual Compute instance.
  b) Collection Method: OM
  c) Trigger: the VNFM can receive (e.g., via communication circuitry 820) one or more VmemoryUsagePeak measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VmemoryUsagePeak measurement(s) from VirtualCompute instance(s) to the VNF instance(s) identified by objectType and objectInstanceId. The VNFM can generate (e.g., via processor(s) 810) the measurement for the subject VNF instance(s) by assigning the performanceValue of the VmemoryUsagePeak measurement(s) to the sub-counter(s) per VirtualCompute instance.
  d) Measurement Unit: Each sub-counter of the measurement can be a real value indicating the percentage of the memory resources that are used.
  e) Measurement Group: VirtualisedComputeResource
  f) Measured Object Type: objectType is Vnf, objectInstanceId can be equal to the vnfInstanceId of the measured Vnf instance.
  g) Measurement Name: VmemoryUsagePeakVnf.vComputeId, where vComputeId can be equal to the computeId of the VirtualCompute resource.

Mean disk usage of VNF instance, which can have the following characteristics:
  a) Description: This measurement can provide the mean (e.g., weighted mean, etc.) disk usage of the underlying Virtual Computes of a VNF instance. This measurement can be split into sub-counters per Virtual Compute instance.
  b) Collection Method: OM
  c) Trigger: the VNFM can receive (e.g., via communication circuitry 820) one or more VdiskUsageMean measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VdiskUsageMean measurement(s) from VirtualCompute instance(s) to the VNF instance(s) identified by objectType and objectInstanceId. The VNFM can generate (e.g., via processor(s) 810) the measurement for the subject VNF instance(s) by assigning the performanceValue of the VdiskUsageMean measurement(s) to the sub-counter(s) per VirtualCompute instance.

d) Measurement Unit: Each sub-counter of the measurement can be a real value indicating the percentage of the memory resources that are used.
e) Measurement Group: VirtualisedComputeResource
f) Measured Object Type: objectType is Vnf or Vnfc, objectInstanceId can be equal to the vnfInstanceId of the measured Vnf instance.
g) Measurement Name: VdiskUsagePeakVnf.vStorageId, where vStorageId can be equal to the StorageId of the VirtualStorage resource.

Peak disk usage of VNF instance, which can have the following characteristics:
a) Description: This measurement can provide the peak disk usage of the underlying Virtual Computes of a VNF instance. This measurement can be split into sub-counters per Virtual Compute instance.
b) Collection Method: OM
c) Trigger: the VNFM can receive (e.g., via communication circuitry 820) one or more VdiskUsagePeak measurement(s) for the VirtualCompute instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VdiskUsagePeak measurement(s) from VirtualCompute instance(s) to the VNF instance(s) identified by objectType and objectInstanceId. The VNFM can generate (e.g., via processor(s) 810) the measurement for the subject VNF instance(s) by assigning the performanceValue of the VdiskUsagePeak measurement(s) to the sub-counter(s) per VirtualCompute instance.
d) Measurement Unit: Each sub-counter of the measurement can be a real value indicating the percentage of the memory resources that are used.
e) Measurement Group: VirtualisedComputeResource
f) Measured Object Type: objectType is Vnf, objectInstanceId can be equal to the vnfInstanceId of the measured Vnf instance.
g) Measurement Name: VdiskUsagePeakVnf.vStorageId, where vStorageId can be equal to the StorageId of the VirtualStorage resource.

Number of incoming bytes of VNF instance, which can have the following characteristics:
a) Description: This measurement can provide the number of bytes received by the virtual network interfaces under the instantiated compute resource(s) of a VNF instance. This measurement can be split into sub-counters per virtual network interface.
b) Collection Method: OM
c) Trigger: the VNFM can receive (e.g., via communication circuitry 820) one or more VnetByteIncoming measurement(s) for the VirtualNetworkInterface instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VnetByteIncoming measurement(s) from VirtualNetworkInterface instance(s) to the VNF instance(s) identified by objectType and objectInstanceId. The VNFM can generate (e.g., via processor(s) 810) the measurement for the subject VNF instance(s) by assigning the performanceValue of the VnetByteIncoming measurement(s) to the sub-counter(s) per VirtualNetworkInterface instance.
d) Measurement Unit: Each sub-counter of the measurement can be a real value.
e) Measurement Group: VirtualNetworkInterface
f) Measured Object Type: objectType is Vnf, objectInstanceId can be equal to the vnfInstanceId of the measured Vnf instance.
g) Measurement Name: VnetByteIncomingVnf.VnetItfId, where VnetItfId can be equal to the resourceId of the virtual network interface.

Number of outgoing bytes of VNF instance, which can have the following characteristics:
a) Description: This measurement can provide the number of bytes transmitted by the virtual network interfaces under the instantiated compute resource(s) of a VNF instance. This measurement can be split into sub-counters per virtual network interface.
b) Collection Method: OM
c) Trigger: the VNFM can receive (e.g., via communication circuitry 820) one or more VnetByteOutgoing measurement(s) for the VirtualNetworkInterface instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VnetByteOutgoing measurement(s) from VirtualNetworkInterface instance(s) to the VNF instance(s) identified by objectType and objectInstanceId. The VNFM can generate (e.g., via processor(s) 810) the measurement for the subject VNF instance(s) by assigning the performanceValue of the VnetByteOutgoing measurement(s) to the sub-counter(s) per VirtualNetworkInterface instance.
d) Measurement Unit: Each sub-counter of the measurement can be a real value.
e) Measurement Group: VirtualNetworkInterface
f) Measured Object Type: objectType is Vnf, objectInstanceId can be equal to the vnfInstanceId of the measured Vnf instance.
g) Measurement Name: VnetByteOutgoingVnf.VnetItfId, where VnetItfId can be equal to the resourceId of the virtual network interface.

Number of incoming packets of VNF instance, which can have the following characteristics:
a) Description: This measurement can provide the number of packets received by the virtual network interfaces under the instantiated compute resource(s) of a VNF instance. This measurement can be split into sub-counters per virtual network interface.
b) Collection Method: OM
c) Trigger: the VNFM can receive (e.g., via communication circuitry 820) one or more VnetPacketIncoming measurement(s) for the VirtualNetworkInterface instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VnetPacketIncoming measurement(s) from VirtualNetworkInterface instance(s) to the VNF instance(s) identified by objectType and objectInstanceId. The VNFM can generate (e.g., via processor(s) 810) the measurement for the subject VNF instance(s) by assigning the performanceValue of the VnetPacketIncoming measurement(s) to the sub-counter(s) per VirtualNetworkInterface instance.

d) Measurement Unit: Each sub-counter of the measurement can be a real value.
e) Measurement Group: VirtualNetworkInterface
f) Measured Object Type: objectType is Vnf, objectInstanceId can be equal to the vnfInstanceId of the measured Vnf instance.
g) Measurement Name: VnetPacketIncomingVnf.VnetItfId, where VnetItfId can be equal to the resourceId of the virtual network interface.

Number of outgoing packets of VNF instance, which can have the following characteristics:
  a) Description: This measurement can provide the number of packets transmitted by the virtual network interfaces under the instantiated compute resource(s) of a VNF instance. This measurement can be split into sub-counters per virtual network interface.
  b) Collection Method: OM
  c) Trigger: the VNFM can receive (e.g., via communication circuitry 820) one or more VnetPacketOutgoing measurement(s) for the VirtualNetworkInterface instance(s) that can be identified by objectType and objectInstanceId from VIM (e.g., generated by processor(s) 910 and sent via communication circuitry 920 via the Vi-Vnfm reference point) in the collection period(s), and can map (e.g., via processor(s) 810) the received VnetPacketOutgoing measurement(s) from VirtualNetworkInterface instance(s) to the VNF instance(s) identified by objectType and objectInstanceId. The VNFM can generate (e.g., via processor(s) 810) the measurement for the subject VNF instance(s) by assigning the performanceValue of the VnetPacketOutgoing measurement(s) to the sub-counter(s) per VirtualNetworkInterface instance.
  d) Measurement Unit: Each sub-counter of the measurement can be a real value.
  e) Measurement Group: VirtualNetworkInterface
  f) Measured Object Type: objectType is Vnf, objectInstanceId can be equal to the vnfInstanceId of the measured Vnf instance.
  g) Measurement Name: VnetPacketOutgoingVnf.VnetItfId, where VnetItfId can be equal to the resourceId of the virtual network interface.

For Or-Vi Reference Point

Mean virtual CPU usage, which can have the following characteristics:
  a) Description: This measurement can provide the mean (e.g., weighted mean, etc.) virtual CPU usage of the virtualized compute resource.
  b) Collection Method: SC
  c) Trigger: the VIM can receive (e.g., via communication circuitry 920) the cpu_utilization measurement(s) from NFVI (e.g., generated by processor(s) 1010 and sent via communication circuitry 1020 via the Nf-Vi reference point) at the pre-defined interval, and then takes the arithmetic mean (e.g., via processor(s) 910) of the virtual CPU usage metrics received in the collection period(s).
  d) Measurement Unit: Each measurement can be a real value indicating the percentage of the virtual CPU resources that are used.
  e) Measurement Group: VirtualisedComputeResource
  f) Measured Object Type: objectType is VirtualCompute, objectInstanceId can be equal to the computeId of the measured VirtualCompute resource.
  g) Measurement Name: VcpuUsageMean (used as the content of performanceMetric).

Peak virtual CPU usage, which can have the following characteristics:
  a) Description: This measurement can provide the peak virtual CPU usage of the virtualized compute resource.
  b) Collection Method: SC
  c) Trigger: the VIM can receive (e.g., via communication circuitry 920) the cpu_utilization measurement(s) from NFVI (e.g., generated by processor(s) 1010 and sent via communication circuitry 1020 via the Nf-Vi reference point) at the pre-defined interval, and then select the maximum metric (e.g., via processor(s) 910) among the virtual CPU usage metrics received in the collection period(s).
  d) Measurement Unit: Each measurement can be a real value indicating the percentage of the virtual CPU resources that are used.
  e) Measurement Group: VirtualisedComputeResource
  f) Measured Object Type: objectType is VirtualCompute, objectInstanceId can be equal to the computeId of the measured VirtualCompute resource.
  g) Measurement Name: VcpuUsagePeak (used as the content of performanceMetric).

Mean memory usage, which can have the following characteristics:
  a) Description: This measurement can provide the mean (e.g., weighted mean, etc.) memory usage of the virtualized compute resource.
  b) Collection Method: SC
  c) Trigger: the VIM can receive (e.g., via communication circuitry 920) the memory_utilization measurement(s) from NFVI (e.g., generated by processor(s) 1010 and sent via communication circuitry 1020 via the Nf-Vi reference point) at the pre-defined interval, and then takes the arithmetic mean (e.g., via processor(s) 910) of the memory usage metrics received in the collection period(s).
  d) Measurement Unit: Each measurement can be a real value indicating the percentage of the memory resources that are used.
  e) Measurement Group: VirtualisedComputeResource
  f) Measured Object Type: objectType is VirtualCompute, objectInstanceId can be equal to the computeId of the measured VirtualCompute resource.
  g) Measurement Name: VmemoryUsageMean (used as the content of performanceMetric).

Peak memory usage, which can have the following characteristics:
  a) Description: This measurement can provide the peak memory usage of the virtualized compute resource.
  b) Collection Method: SC
  c) Trigger: the VIM can receive (e.g., via communication circuitry 920) the memory_utilization measurement(s) from NFVI (e.g., generated by processor(s) 1010 and sent via communication circuitry 1020 via the Nf-Vi reference point) at the pre-defined interval, and then select the maximum metric (e.g., via processor(s) 910) among the memory usage metrics received in the collection period(s).
  d) Measurement Unit: Each measurement can be a real value indicating the percentage of the memory resources that are used.
  e) Measurement Group: VirtualisedComputeResource
  f) Measured Object Type: objectType is VirtualCompute, objectInstanceId can be equal to the computeId of the measured VirtualCompute resource.
  g) Measurement Name: VmemoryUsagePeak (used as the content of performanceMetric).

Mean disk usage, which can have the following characteristics:
- a) Description: This measurement can provide the mean (e.g., weighted mean, etc.) disk usage of the virtualized storage resource.
- b) Collection Method: SC
- c) Trigger: the VIM can receive (e.g., via communication circuitry 920) the disk_utilization measurement(s) from NFVI (e.g., generated by processor(s) 1010 and sent via communication circuitry 1020 via the Nf-Vi reference point) at the pre-defined interval, and then takes the arithmetic mean (e.g., via processor(s) 910) of the disk usage metrics received in the collection period(s).
- d) Measurement Unit: Each measurement can be a real value indicating the percentage of the disk resources that are used.
- e) Measurement Group: VirtualisedComputeResource
- f) Measured Object Type: objectType is VirtualStorage, objectInstanceId can be equal to the storageId of the measured VirtualStorage instance.
- g) Measurement Name: VdiskUsageMean (used as the content of performanceMetric).

Peak disk usage, which can have the following characteristics:
- a) Description: This measurement can provide the peak disk usage of the virtualized storage resource.
- b) Collection Method: SC
- c) Trigger: the VIM can receive (e.g., via communication circuitry 920) the disk_utilization measurement(s) from NFVI (e.g., generated by processor(s) 1010 and sent via communication circuitry 1020 via the Nf-Vi reference point) at the pre-defined interval, and then select the maximum metric (e.g., via processor(s) 910) among the disk usage metrics received in the collection period(s).
- d) Measurement Unit: Each measurement can be a real value indicating the percentage of the disk resources that are used.
- e) Measurement Group: VirtualisedComputeResource
- f) Measured Object Type: objectType is VirtualStorage, objectInstanceId can be equal to the storageId of the measured VirtualStorage instance.
- g) Measurement Name: VdiskUsagePeak (used as the content of performanceMetric).

Number of incoming bytes on virtual network interface, which can have the following characteristics:
- a) Description: This measurement can provide the number of bytes received at the virtual network interface which is the communication endpoint under an instantiated compute resource.
- b) Collection Method: TF
- c) Trigger: A measurement can be generated (e.g., by processor(s) 910) when the VIM receives (e.g., via communication circuitry 920) the num_of_incoming_bytes measurement(s) from NFVI (e.g., generated by processor(s) 1010 and sent via communication circuitry 1020 via the Nf-Vi reference point).
- d) Measurement Unit: Each measurement can be a real value.
- e) Measurement Group: VirtualNetworkInterface
- f) Measured Object Type: objectType is VirtualNetworkInterface, objectInstanceId can be equal to the resourceId of the measured virtual network interface.
- g) Measurement Name: VnetByteIncoming Number of outgoing bytes on virtual network interface, which can have the following characteristics:
- a) Description: This measurement can provide the number of bytes transmitted at the virtual network interface which is the communication endpoint under an instantiated compute resource.
- b) Collection Method: TF
- c) Trigger: A measurement can be generated (e.g., by processor(s) 910) when the VIM receives (e.g., via communication circuitry 920) the num_of_outgoing_bytes measurement(s) from NFVI (e.g., generated by processor(s) 1010 and sent via communication circuitry 1020 via the Nf-Vi reference point).
- d) Measurement Unit: Each measurement can be a real value.
- e) Measurement Group: VirtualNetworkInterface
- f) Measured Object Type: objectType is VirtualNetworkInterface, objectInstanceId can be equal to the resourceId of the measured virtual network interface.
- g) Measurement Name: VnetByteOutgoing Number of incoming packets on virtual network interface, which can have the following characteristics:
- a) Description: This measurement can provide the number of packets received at the virtual network interface which is the communication endpoint under an instantiated compute resource.
- b) Collection Method: TF
- c) Trigger: A measurement can be generated (e.g., by processor(s) 910) when the VIM receives (e.g., via communication circuitry 920) the num_of_incoming_packets measurement(s) from NFVI (e.g., generated by processor(s) 1010 and sent via communication circuitry 1020 via the Nf-Vi reference point).
- d) Measurement Unit: Each measurement can be a real value.
- e) Measurement Group: VirtualNetworkInterface
- f) Measured Object Type: objectType is VirtualNetworkInterface, objectInstanceId can be equal to the resourceId of the measured virtual network interface.
- g) Measurement Name: VnetPacketIncoming Number of outgoing packets on virtual network interface, which can have the following characteristics:
- a) Description: This measurement can provide the number of packets transmitted at the virtual network interface which is the communication endpoint under an instantiated compute resource.
- b) Collection Method: TF
- c) Trigger: A measurement can be generated (e.g., by processor(s) 910) when the VIM receives (e.g., via communication circuitry 920) the num_of_outgoing_packets measurement(s) from NFVI (e.g., generated by processor(s) 1010 and sent via communication circuitry 1020 via the Nf-Vi reference point).
- d) Measurement Unit: Each measurement can be a real value.
- e) Measurement Group: VirtualNetworkInterface
- f) Measured Object Type: objectType is VirtualNetworkInterface, objectInstanceId can be equal to the resourceId of the measured virtual network interface.
- g) Measurement Name: VnetPacketOutgoing For Os-Mo-nfvo Number of incoming bytes of NS instance, which can have the following characteristics:
- a) Description: This measurement can provide the number of bytes received by the virtual network interface under the instantiated compute resource(s) of a NS instance.
- b) Collection Method: OM
- c) Trigger: The NFVO can receive (e.g., via communication circuitry 720) one or more VnetByteIncomingVnf measurement(s) for the Vnf instance(s) that can be identified by objectType and objectInstanceId from VNFM (e.g., generated by processor(s) 810, sent via communication circuitry 820 over the Or-Vnfm reference point) in the collection period(s), and can map (e.g., via processor(s) 710) the received VnetByteIncomingVnf measurement(s) from Vnf instance(s) to the Network Service instance identified by objectType and objectInstanceId. The NFVO can generate (e.g., via processor(s) 710) the measurement for the subject NS instance by summing up the performanceValue of the mapped VnetByteIncomingVnf measurement(s). The data received by virtual network interfaces inside the Network Service instance can remain uncounted.
  d) Measurement Unit: Each measurement can be a real value.
  e) Measurement Group: VirtualNetworkInterface
  f) Measured Object Type: objectType is NS, objectInstanceId can be equal to the nsInstanceId of the measured NS instance.
  g) Measurement Name: VnetByteIncomingNs
Number of outdoing bytes of NS instance, which can have the following characteristics:
  a) Description: This measurement can provide the number of bytes transmitted by the virtual network interface under the instantiated compute resource(s) of a NS instance.
  b) Collection Method: OM
  c) Trigger: The NFVO can receive (e.g., via communication circuitry 720) one or more VnetByteOutgoingVnf measurement(s) for the Vnf instance(s) that can be identified by objectType and objectInstanceId from VNFM (e.g., generated by processor(s) 810, sent via communication circuitry 820 over the Or-Vnfm reference point) in the collection period(s), and can map (e.g., via processor(s) 710) the received VnetByteOutgoingVnf measurement(s) from Vnf instance(s) to the Network Service instance identified by objectType and objectInstanceId. The NFVO can generate (e.g., via processor(s) 710) the measurement for the subject NS instance by summing up the performanceValue of the mapped VnetByteOutgoingVnf measurement(s). The data transmitted by virtual network interfaces inside the Network Service instance can remain uncounted.
  d) Measurement Unit: Each measurement can be a real value.
  e) Measurement Group: VirtualNetworkInterface
  f) Measured Object Type: objectType is NS, objectInstanceId can be equal to the nsInstanceId of the measured NS instance.
  g) Measurement Name: VnetByteOutgoingNs
Number of incoming packets of NS instance, which can have the following characteristics:
  a) Description: This measurement can provide the number of packets received by the virtual network interface under the instantiated compute resource(s) of a NS instance.
  b) Collection Method: OM
  c) Trigger: The NFVO can receive (e.g., via communication circuitry 720) one or more VnetPacketIncomingVnf measurement(s) for the Vnf instance(s) that can be identified by objectType and objectInstanceId from VNFM (e.g., generated by processor(s) 810, sent via communication circuitry 820 over the Or-Vnfm reference point) in the collection period(s), and can map (e.g., via processor(s) 710) the received VnetPacketIncomingVnf measurement(s) from Vnf instance(s) to the Network Service instance identified by objectType and objectInstanceId. The NFVO can generate (e.g., via processor(s) 710) the measurement for the subject NS instance by summing up the performanceValue of the mapped VnetPacketIncomingVnf measurement(s). The data received by virtual network interfaces inside the Network Service instance can remain uncounted.
  d) Measurement Unit: Each measurement can be a real value.
  e) Measurement Group: VirtualNetworkInterface
  f) Measured Object Type: objectType is NS, objectInstanceId can be equal to the nsInstanceId of the measured NS instance.
  g) Measurement Name: VnetPacketIncomingNs
Number of outgoing bytes of NS instance, which can have the following characteristics:
  a) Description: This measurement can provide the number of packets transmitted by the virtual network interface under the instantiated compute resource(s) of a NS instance.
  b) Collection Method: OM
  c) Trigger: The NFVO can receive (e.g., via communication circuitry 720) one or more VnetPacketOutgoingVnf measurement(s) for the Vnf instance(s) that can be identified by objectType and objectInstanceId from VNFM (e.g., generated by processor(s) 810, sent via communication circuitry 820 over the Or-Vnfm reference point) in the collection period(s), and can map (e.g., via processor(s) 710) the received VnetPacketOutgoingVnf measurement(s) from Vnf instance(s) to the Network Service instance identified by objectType and objectInstanceId. The NFVO can generate (e.g., via processor(s) 710) the measurement for the subject NS instance by summing up the performanceValue of the mapped VnetPacketOutgoingVnf measurement(s). The data transmitted by virtual network interfaces inside the Network Service instance can remain uncounted.
  d) Measurement Unit: Each measurement can be a real value.
  e) Measurement Group: VirtualNetworkInterface
  f) Measured Object Type: objectType is NS, objectInstanceId can be equal to the nsInstanceId of the measured NS instance.
  g) Measurement Name: VnetPacketOutgoing Ns

ADDITIONAL EMBODIMENTS

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

A first example embodiment in accordance with a first set of aspects described herein (e.g., related to 3GPP NF PMs) comprises an EM comprising one or more processor(s) (e.g., processor(s) 610) configured to (or a method comprising): receive one or more performance measurements related to Virtualized Resource (VR) that can be collected for VNF or VNFC instance(s) from VNFM (e.g., via processor(s) 810, and sent via communication circuitry 820 over the Ve-Vnfm-em reference point and received by communication circuitry 620); convert or map the measured object of the received performance measurements from VNF/VNFC instance(s) to Managed Object Instance(s) (MOI(s)) of a 3GPP Network Function (NF); generate the performance measurement(s) related to VR for the MOI(s) of the 3GPP NF; and report the performance measurement(s) related to VR with the MOI(s) of the 3GPP NF as measured object(s) to a Network Manager (NM) (e.g., via a report generated by processor(s) 610, sent via communication circuitry 620 over the Ift-N reference point, received by communication circuitry 420, and processed by processor(s) 410).

A second example embodiment in accordance with the first set of aspects described herein comprises a NM (Network Manager) comprising one or more processors configured to (or a method comprising): receive from an EM one or more performance measurements related to Virtualized Resource (VR) that are collected for MOI(s) of a 3GPP NF (e.g., generated by processor(s) 610, sent via communication circuitry 620 over reference point Itf-N, received via communication circuitry 420, and processed by processor(s) 410).

In various embodiments of the first or second example embodiments of the first set of aspects, or any embodiments thereof, the VR can be a virtualized compute resource.

In various embodiments of the first or second example embodiments of the first set of aspects, or any embodiments thereof, the performance measurement related to VR can be split into one or more subcounters.

In various embodiments of the first or second example embodiments of the first set of aspects, or any embodiments thereof, the performance measurement related to VR can be one of a mean virtual CPU usage, a peak virtual CPU usage, a mean virtual memory usage, a peak virtual memory usage, a mean virtual disk usage, or a peak virtual disk usage.

In various embodiments of the first or second example embodiments of the first set of aspects, or any embodiments thereof, the subcounter(s) can be per virtual compute instance.

In various embodiments of the first or second example embodiments of the first set of aspects, or any embodiments thereof, the 3GPP NF can be part of one of an EPC or an IMS.

In various embodiments of the first or second example embodiments of the first set of aspects, or any embodiments thereof, the MOI(s) of the 3GPP can be one or more of: MMEFunction, PGWFunction, ServingGWFunction, MBMSGWFunction, PCRFFunction, PCSCFFunction, SCSCFFunction, HSSFunction, BGCFFunction, MGCF-Function, MRFCFunction, MRFPFunction, SLFFunction, ASFunction, or IBCFFunction.

In various embodiments of the first or second example embodiments of the first set of aspects, or any embodiments thereof, the NM can be further configured to (or the method can further comprise): analyze the received 3GPP NF performance measurements related to VR; correlate the received 3GPP NF performance measurements related to VR with the performance measurements related to 3GPP NF, determine whether there are any performance issues on the 3GPP NF caused by VR; and take actions to solve the determined performance issues, if any.

In various embodiments of the first or second example embodiments of the first set of aspects, or any embodiments thereof, the action(s) can comprise scaling in/out the VNF instance that realizes the 3GPP NF, or switching on/off the auto-scaling for the VNF instance realizing the 3GPP NF.

A first example embodiment in accordance with a second set of aspects described herein (e.g., related to PMs associated with specific reference points) comprises a Virtualized Network Function Manager (VNFM) comprising one or more processors (e.g., processor(s) 810) configured to (or method comprising): receive (e.g., via communication circuitry 820) one or more performance measurements related to Virtualized Resource (VR) that are collected for virtualized resource instances from VIM (e.g., generated by processor(s) 910, sent via communication circuitry 920 over the Vi-Vnfm reference point); map the measured object of the received performance measurement(s) from virtualized resource instance(s) to VNF/VNFC instance(s); perform processing of the mapped the performance measurement(s); generate the performance measurement(s) related to VR for VNF/VNFC instance(s); and report the performance measurement(s) related to VR with the VNF/VNFC instance(s) as measured object(s) to an EM (e.g., via a report generated by processor(s) 810, sent via communication circuitry 820 over the Ve-Vnfm-em reference point, received by communication circuitry 620, and processed by processor(s) 610), or report the performance measurement(s) related to VR with the VNF instance(s) as measured object(s) to a NFVO (e.g., via a report generated by processor(s) 810, sent via communication circuitry 820 over the Or-Vnfm reference point, received by communication circuitry 720, and processed by processor(s) 710).

In various embodiments of the first example embodiment of the first set of aspects, or any embodiments thereof, the processing can comprise assigning the performance value of the received performance measurement(s) to sub-counter(s) of the performance measurement(s) related to VR for VNF/VNFC instance(s).

A second example embodiment in accordance with the second set of aspects described herein comprises a Virtualization Infrastructure Manager (VIM) comprising one or more processors (e.g., processor(s) 910) configured to (or method comprising): receive (e.g., via communication circuitry 920) one or more performance metrics that are collected for specific virtualized resource instances from an NFVI (e.g., generated by processor(s) 1010, sent via communication circuitry 1020 over the Nf-Vi reference point) at a pre-defined interval; perform processing of the performance metric(s) received via all of the intervals within the collection period(s); generate the performance measurement(s) for a virtualized resource instance; and report the performance measurement(s) for a virtualized resource instance to a VNFM (e.g., e.g., via a report generated by processor(s) 910, sent via communication circuitry 920 over the Vi-Vnfm reference point, received by communication circuitry 820, and processed by processor(s) 810) or NFVO (e.g., via a report generated by processor(s) 910, sent via communication circuitry 920 over the Or-Vi reference point, received by communication circuitry 720, and processed by processor(s) 710).

In various embodiments of the second example embodiment associated with the second set of aspects, or any embodiments thereof, the processing comprises one of taking an arithmetic mean (e.g., weighted mean, etc.) or selecting the maximum.

A third example embodiment in accordance with the second set of aspects described herein comprises a Network Function Virtualization Orchestrator (NFVO) comprising one or more processors (e.g., processor(s) 710) configured to (or method comprising): receive (e.g., via communication circuitry 720) one or more performance measurements related to VR that are collected for virtualized resource instances from VIM (e.g., generated by processor(s) 810, sent via communication circuitry 820 over the Or-Vnfm reference point); map the measured object of the received performance measurement(s) from virtualized resource instance to Network Service (NS) instance; perform processing of the mapped performance measurement(s); generate the performance measurement(s) related to VR for a NS instance; and report the performance measurement(s) related to VR with the NS instance as measured object(s) to an Operation Support System (OSS) (e.g., via a report generated by processor(s) 710, sent via communication circuitry 720 over the Os-Ma-nfvo reference point, received by communication circuitry 520, and processed by processor(s) 510).

A fourth example embodiment in accordance with the second set of aspects described herein comprises a Network Function Virtualization Orchestrator (NFVO) comprising one or more processors (e.g., processor(s) 710) configured to (or method comprising): receive (e.g., via communication circuitry 720) one or more performance measurements related to VR that are collected for VNF instance(s) from VNFM (e.g., generated by processor(s) 810, sent via communication circuitry 820 over the Or-Vnfm reference point); map the measured object of the received performance measurement(s) from VNF instance(s) to Network Service (NS) instance(s); perform processing of the mapped the performance measurement(s); generate the performance measurement(s) related to VR for NS instance(s); and report the performance measurement(s) related to VR with the NS instance as measured object to an Operation Support System (OSS) (e.g., via a report generated by processor(s) 710, sent via communication circuitry 720 over the Os-Ma-nfvo reference point, received by communication circuitry 520, and processed by processor(s) 510).

In various embodiments of the third or fourth example embodiment of the second set of aspects, or any embodiments thereof, the processing comprises summing up the performance value of the received performance measurement(s) for NS instance(s).

A fifth example embodiment in accordance with the second set of aspects described herein comprises an Element Manager (EM) comprising one or more processors (e.g., processor(s) 610) configured to (or method comprising): receive (e.g., via communication circuitry 620) one or more performance measurements related to VR with the VNF/VNFC instance as measured object from VNFM (e.g., generated by processor(s) 810, sent via communication circuitry 820 via the Ve-Vnfm-em reference point).

A sixth example embodiment in accordance with the second set of aspects described herein comprises an Operation Support System (OSS) comprising one or more processors (e.g., processor(s) 510) configured to (or method comprising): receive one or more performance measurements related to VR with the NS instance(s) as measured object(s) from NFVO (e.g., generated by processor(s) 710, sent via communication circuitry 720 over the Os-Ma-nfvo reference point).

In various embodiments of any example embodiment of the second set of aspects, the virtualized resource instance is a virtual compute instance.

In various embodiments of any example embodiment of the second set of aspects, the virtualized resource instance is a virtual network interface.

In various embodiments of any example embodiment of the second set of aspects, the virtualized resource instance is a virtual storage instance.

In various embodiments of any example embodiment of the second set of aspects, or any embodiments thereof, the performance measurement/metric is one of a mean virtual CPU usage, a peak virtual CPU usage, a mean memory usage, a peak memory usage, a number of incoming bytes, a number of outgoing bytes, a number of incoming packets, a number of outgoing packets, a mean disk usage, or a peak disk usage.

In various embodiments of any example embodiment of the second set of aspects, or any embodiments thereof, the sub-counter(s) is/are one of per virtual compute instance or per virtual network interface.

In various embodiments of any example embodiment of the second set of aspects, or any embodiments thereof, the performance measurement is identified by a measurement name. In various such embodiments, the measurement name is identified by <measurement type>.<sub-counter name> when the sub-counter is used. In various such embodiments, the measurement name is used to identify the performanceMetric in a performance report. In various such embodiments, the measurement name is the content of the performanceMetric in the PM Job to identify the type of measurement(s) to be collected in a create PM Job operation. In various such embodiments, the PM Job is applicable to the sub-counters of the performance measurement when the measurement comprises sub-counters.

Example 1 is an apparatus configured to be employed within an EM (Element Manager), comprising: a memory interface; and processing circuitry configured to: receive one or more Virtualized Resource (VR)-related performance measurements for at least one of one or more Virtual Network Function (VNF) instances or one or more VNF Component (VNFC) instances from a VNF Manager (VNFM) in at least one collection period; map one or more measured objects from the at least one of the one or more VNFs or the one or more VNFCs to one or more Managed Object Instances (MOIs) of a Third Generation Partnership Project (3GPP) Network Function (NF); generate one or more 3GPP performance measurements for the one or more MOIs from the mapped one or more measured objects; and send the one or more 3GPP performance measurements to a memory via the memory interface.

Example 2 comprises the subject matter of any variation of any of example(s) 1, wherein the processing circuitry is further configured to report the one or more 3GPP performance measurements for one or more measured objects to a Network Manager (NM).

Example 3 comprises the subject matter of any variation of any of example(s) 1-2, wherein each of the one or more VR-related performance measurements is one of a mean virtual Central Processing Unit (CPU) usage, a peak virtual CPU usage, a mean virtual memory usage, a peak virtual memory usage, a mean virtual disk usage, a peak virtual disk usage.

Example 4 comprises the subject matter of any variation of any of example(s) 1-3, wherein the VR is a virtualized compute resource, a virtual CPU, a virtual memory, or a virtual disk.

Example 5 comprises the subject matter of any variation of any of example(s) 1-4, wherein each of the one or more VR-related performance measurements is split into one or more associated sub-counters.

Example 6 comprises the subject matter of any variation of any of example(s) 5, wherein each of the one or more associated sub-counters is associated with a distinct virtual compute instance.

Example 7 comprises the subject matter of any variation of any of example(s) 1-6, wherein the 3GPP NF is a portion of one of an Evolved Packet Core (EPC) or an Internet Protocol (IP) Multimedia Subsystem (IMS).

Example 8 comprises the subject matter of any variation of any of example(s) 1-7, wherein each of the one or more MOIs is one of the IOC (Information Object Class) MME-Function (the IOC for Mobility Management Entity), the IOC PGWFunction (the IOC for Packet Data Network (PDN) GateWay), the IOC ServingGWFunction (the IOC for Serving GateWay), the IOC MBMSGWFunction (the IOC for Multimedia Broadcast Multicast Service GateWay), the IOC PCRFFunction (the IOC for Policy and Charging Rules Function (PCRF)), the IOC PCSCFFunction (the IOC for Proxy Call Session Control Function (CSCF)), the IOC SCSCFFunction (the IOC for Serving CSCF Function), the IOC HSSFunction (the IOC for Home Subscriber Service (HSS)), the IOC BGCFFunction (the IOC for Breakout Gateway Control Function (BGCF)), the IOC MGCFFunction (the IOC for Media Gateway Control Function (MGCF)), the IOC MRFCFunction (the IOC for Multimedia Resource Function Controller (MRFC)), the IOC MRFPFunction (the IOC for Multimedia Resource Function Processor (MRFP)), the IOC SLFFunction (the IOC for Subscriber Location Function (SLF)), the IOC ASFunction (the IOC for Application Server(s) (AS)), or the IOC IBCF-Function (the IOC for Interconnection Border Control Function (IBCF)).

Example 9 comprises the subject matter of any variation of any of example(s) 1-8, wherein each of the at least one of the one or more VNFs or the one or more VNFCs is identified by an objectType (object type) parameter and an objectInstanceId (object instance identifier) parameter.

Example 10 is an apparatus configured to be employed within a VNFM (VNF (Virtual Network Function) Manager), comprising: a memory interface; and processing circuitry configured to: receive a first set of one or more Virtualized Resource (VR)-related performance measurements from a Virtualization Infrastructure Manager (VIM), wherein the first set of one or more VR-related performance measurements is for one or more virtualized resource instances; map one or more measured objects of the first set of one or more VR-related performance measurements from the one or more VR instances to at least one of one or more Virtual Network Function (VNF) instances or one or more VNF Component (VNFC) instances; generate a second set of one or more VR-related performance measurements for the at least one of the one or more VNF instances or the one or more VNFC instances; and send the first set of one or more VR-related performance measurements to a memory via the memory interface.

Example 11 comprises the subject matter of any variation of any of example(s) 10, wherein the processing circuitry is further configured to one of: report the second set of one or more VR-related performance measurements to an Element Manager (EM); or report the second set of one or more VR-related performance measurements to a Network Function Virtualization Orchestrator (NFVO), wherein the at least one of the one or more VNF instances or one or more VNFC instances is the one or more VNF instances.

Example 12 comprises the subject matter of any variation of any of example(s) 10-11, wherein each of the one or more VR instances is one of a virtual compute instance, a virtual storage instance, or a virtual network interface.

Example 13 comprises the subject matter of any variation of any of example(s) 10-12, wherein each VR-related performance measurements of the first set of one or more VR performance measurements or the second set of one or more VR performance measurements is one of a mean virtual CPU usage, a peak virtual CPU usage, a mean memory usage, a peak memory usage, a mean disk usage, a peak disk usage, a number of incoming bytes, a number of outgoing bytes, a number of incoming packets, or a number of outgoing packets.

Example 14 comprises the subject matter of any variation of any of example(s) 10-13, wherein the processing circuitry is further configured to perform processing on the second set of one or more VR-related performance measurements.

Example 15 comprises the subject matter of any variation of any of example(s) 14, wherein the processing comprises assigning the second set of one or more VR-related performance measurements to one or more sub-counters of the first set of VR-related performance measurements.

Example 16 comprises the subject matter of any variation of any of example(s) 15, wherein each of the one or more sub-counters is associated with a distinct VR instance of the one or more VR instances.

Example 17 comprises the subject matter of any variation of any of example(s) 10-16, wherein each VR-related performance measurement of the first set of one or more VR-related performance measurements and the second set of one or more VR-related performance measurements is identified by an associated measurement name.

Example 18 comprises the subject matter of any variation of any of example(s) 17, wherein each VR-related performance measurement of the second set of one or more VR-related performance measurements is associated with an associated sub-counter and has an associated measurement type, wherein the associated measurement name of each VR-related performance measurement is an associated <measurement type>.<sub-counter name>, wherein a <measurement type> of the associated <measurement type>.<sub-counter name> is the associated measurement type of that VR-related performance measurement, and wherein a <sub-counter name> of the associated <measurement type>.<sub-counter name> is a name of the associated sub-counter of that VR-related performance measurement.

Example 19 comprises the subject matter of any variation of any of example(s) 17, wherein the processing circuitry is further configured to generate a performance report that comprises an associated performanceMetric (performance metric) parameter for each VR-related performance measurement of the second set of one or more VR-related performance measurements that indicates the associated measurement name of that VR-related performance measurement.

Example 20 comprises the subject matter of any variation of any of example(s) 17, the processing circuitry is further configured to generate a PM job in response to a request to create a PM job, wherein the PM job comprises an associated performanceMetric (performance metric) parameter for each VR-related performance measurement of the second set of one or more VR-related performance measurements that indicates the associated measurement name of that VR-related performance measurement.

Example 21 comprises the subject matter of any variation of any of example(s) 20, wherein each VR-related performance measurement of the second set of one or more VR-related performance measurements is associated with an associated sub-counter, and wherein the PM job indicates the associated sub-counter for each VR-related performance measurement of the second set of one or more VR-related performance measurements.

Example 22 is an apparatus configured to be employed within a VIM (Virtualization Infrastructure Manager), comprising: a memory interface; and processing circuitry configured to: receive a first set of one or more Virtualized Resource (VR)-related performance measurements from an NFVI (Network Function Virtualization Infrastructure) in a pre-defined interval associated with a collection period, wherein the first set of one or more VR-related performance measurements is for one or more VR instances; perform processing on the first set of one or more VR-related performance measurements; generate a second set of one or more VR-related performance measurements associated with a selected VR instance of the one or more VR instances; and send the first set of one or more VR-related performance measurements to a memory via the memory interface.

Example 23 comprises the subject matter of any variation of any of example(s) 22, wherein the processing circuitry is further configured to one of: report the second set of one or more VR-related performance measurements to a VNFM (Virtual Network Function Manager); or report the second set of one or more VR-related performance measurements to a NFVO (Network Function Virtualization Orchestrator).

Example 24 comprises the subject matter of any variation of any of example(s) 22-23, wherein the processing performed on the first set of one or more VR-related performance measurements comprises one of taking an arithmetic mean of the first set of one or more VR-related performance measurements or selecting a maximum value of the first set of one or more VR-related performance measurements.

Example 25 comprises the subject matter of any variation of any of example(s) 22-24, wherein each of the one or more VR instances is one of a virtual compute instance, a virtual storage instance, or a virtual network interface.

Example 26 comprises the subject matter of any variation of any of example(s) 22-25, wherein each VR-related performance measurement of the first set of one or more VR performance measurements or the second set of one or more VR performance measurements is one of a mean virtual CPU usage, a peak virtual CPU usage, a mean memory usage, a peak memory usage, a mean disk usage, a peak disk usage, a number of incoming bytes, a number of outgoing bytes, a number of incoming packets, or a number of outgoing packets.

Example 27 comprises the subject matter of any variation of any of example(s) 22-26, wherein the processing performed on the first set of one or more VR-related performance measurements comprises assigning the second set of one or more VR-related performance measurements to one or more sub-counters of the first set of VR-related performance measurements.

Example 28 comprises the subject matter of any variation of any of example(s) 27, wherein each of the one or more sub-counters is associated with a distinct VR instance of the one or more VR instances.

Example 29 comprises the subject matter of any variation of any of example(s) 22-28, wherein each VR-related performance measurement of the first set of one or more VR-related performance measurements and the second set of one or more VR-related performance measurements is identified by an associated measurement name.

Example 30 is an apparatus configured to be employed within a NFVO (NFV (Network Function Virtualization) Orchestrator), comprising: a memory interface; and processing circuitry configured to: receive a first set of one or more Virtualization Resource (VR)-related Performance Measurements for one or more VR instances from a Virtualization Infrastructure Manager (VIM); map one or more measured objects (MOs) of the first set of one or more VR-related performance measurements from the one or more VR instances to one or more Network Service (NS) instances; perform processing on the first set of one or more VR-related performance measurements based on the mapping of the one or more MOs of the first set of one or more VR-related performance measurements; generate a second set of one or more VR-related performance measurements associated with the one or more NS instances; report the second set of one or more VR-related performance measurements to an Operation Support System (OSS), wherein the one or more NS instances are one or more MOs of the second set of one or more VR-related performance measurements; and send the first set of one or more VR-related performance measurements to a memory via the memory interface.

Example 31 comprises the subject matter of any variation of any of example(s) 30, wherein each VR-related performance measurement of the first set of one or more VR-related performance measurements and the second set of one or more VR-related performance measurements has an associated performance value, wherein the processing comprises taking, for each NS instance of the one or more NS instances, a sum of associated performance values of each VR-related performance measurements associated with that NS instance.

Example 32 comprises the subject matter of any variation of any of example(s) 30-31, wherein each VR-related performance measurement of the first set of one or more VR performance measurements or the second set of one or more VR performance measurements is one of a mean virtual CPU usage, a peak virtual CPU usage, a mean memory usage, a peak memory usage, a mean disk usage, a peak disk usage, a number of incoming bytes, a number of outgoing bytes, a number of incoming packets, or a number of outgoing packets.

Example 33 comprises the subject matter of any variation of any of example(s) 30-32, wherein the processing performed on the first set of one or more VR-related performance measurements comprises assigning the second set of one or more VR-related performance measurements to one or more sub-counters of the first set of VR-related performance measurements.

Example 34 comprises the subject matter of any variation of any of example(s) 30-33, wherein each of the one or more sub-counters is associated with a distinct VR instance of the one or more VR instances.

Example 35 comprises the subject matter of any variation of any of example(s) 30-34, wherein each VR-related performance measurement of the first set of one or more VR-related performance measurements and the second set of one or more VR-related performance measurements is identified by an associated measurement name.

Example 36 comprises the subject matter of any variation of any of example(s) 35, wherein each VR-related performance measurement of the second set of one or more VR-related performance measurements is associated with an associated sub-counter and has an associated measurement type, wherein the associated measurement name of each VR-related performance measurement is an associated <measurement type>.<sub-counter name>, wherein a <measurement type> of the associated <measurement type>.<sub-counter name> is the associated measurement type of that VR-related performance measurement, and wherein a <sub-counter name> of the associated <measurement type>.<sub-counter name> is a name of the associated sub-counter of that VR-related performance measurement.

Example 37 comprises the subject matter of any variation of any of example(s) 35, wherein the processing circuitry is further configured to generate a performance report that comprises an associated performanceMetric (performance metric) parameter for each VR-related performance measurement of the second set of one or more VR-related performance measurements that indicates the associated measurement name of that VR-related performance measurement.

Example 38 comprises the subject matter of any variation of any of example(s) 35, the processing circuitry is further configured to generate a PM job in response to a request to create a PM job, wherein the PM job comprises an associated performanceMetric (performance metric) parameter for each VR-related performance measurement of the second set of one or more VR-related performance measurements that indicates the associated measurement name of that VR-related PM.

Example 39 comprises the subject matter of any variation of any of example(s) 38, wherein each VR-related performance measurement of the second set of one or more VR-related performance measurements is associated with an associated sub-counter, and wherein the PM job indicates the associated sub-counter for each VR-related performance measurement of the second set of one or more VR-related performance measurements.

Example 40 is an apparatus configured to be employed within a NFVO (NFV (Network Function Virtualization) Orchestrator), comprising: a memory interface; and processing circuitry configured to: receive a first set of one or more Virtualization Resource (VR)-related Performance Measurements for one or more Virtual Network Function (VNF) instances from a VNF Manager (VNFM); map one or more measured objects (MOs) of the first set of one or more VR-related Performance Measurements from the one or more VNF instances to one or more Network Service (NS) instances; perform processing on the first set of one or more VR-related Performance Measurements based on the mapping of the one or more MOs of the first set of one or more VR-related Performance Measurements; generate a second set of one or more VR-related Performance Measurements associated with the one or more NS instances; report the second set of one or more VR-related Performance Measurements to an Operation Support System (OSS), wherein the one or more NS instances are one or more MOs of the second set of one or more VR-related Performance Measurements; and send the first set of one or more VR-related Performance Measurements to a memory via the memory interface.

Example 41 comprises the subject matter of any variation of any of example(s) 40, wherein each VR-related Performance Measurement of the first set of one or more VR-related Performance Measurements and the second set of one or more VR-related Performance Measurements has an associated performance value, wherein the processing comprises taking, for each NS instance of the one or more NS instances, a sum of associated performance values of each VR-related Performance Measurement associated with that NS instance.

Example 42 comprises the subject matter of any variation of any of example(s) 40-41, wherein each VR-related Performance Measurement of the first set of one or more VR Performance Measurements or the second set of one or more VR Performance Measurements is one of a mean virtual CPU usage, a peak virtual CPU usage, a mean memory usage, a peak memory usage, a mean disk usage, a peak disk usage, a number of incoming bytes, a number of outgoing bytes, a number of incoming packets, or a number of outgoing packets.

Example 43 comprises the subject matter of any variation of any of example(s) 40-42, wherein the processing performed on the first set of one or more VR-related Performance Measurements comprises assigning the second set of one or more VR-related Performance Measurements to one or more sub-counters of the first set of VR-related Performance Measurements.

Example 44 comprises the subject matter of any variation of any of example(s) 40-43, wherein each of the one or more sub-counters is associated with a distinct VR instance of the one or more VR instances.

Example 45 comprises the subject matter of any variation of any of example(s) 40-44, wherein each VR-related Performance Measurement of the first set of one or more VR-related Performance Measurements and the second set of one or more VR-related Performance Measurements is identified by an associated measurement name.

Example 46 comprises the subject matter of any variation of any of example(s) 45, wherein each VR-related Performance Measurement of the second set of one or more VR-related Performance Measurements is associated with an associated sub-counter and has an associated measurement type, wherein the associated measurement name of each VR-related Performance Measurement is an associated <measurement type>.<sub-counter name>, wherein a <measurement type> of the associated <measurement type>.<sub-counter name> is the associated measurement type of that VR-related Performance Measurement, and wherein a <sub-counter name> of the associated <measurement type>.<sub-counter name> is a name of the associated sub-counter of that VR-related Performance Measurement.

Example 47 comprises the subject matter of any variation of any of example(s) 45, wherein the processing circuitry is further configured to generate a performance report that comprises an associated performanceMetric (performance metric) parameter for each VR-related Performance Measurement of the second set of one or more VR-related Performance Measurements that indicates the associated measurement name of that VR-related Performance Measurement.

Example 48 comprises the subject matter of any variation of any of example(s) 45, the processing circuitry is further configured to generate a Performance Measurement job in response to a request to create a Performance Measurement job, wherein the Performance Measurement job comprises an associated performanceMetric (performance metric) parameter for each VR-related Performance Measurement of the second set of one or more VR-related Performance Measurements that indicates the associated measurement name of that VR-related Performance Measurement.

Example 49 comprises the subject matter of any variation of any of example(s) 48, wherein each VR-related Performance Measurement of the second set of one or more VR-related Performance Measurements is associated with an associated sub-counter, and wherein the Performance Measurement job indicates the associated sub-counter for each VR-related Performance Measurement of the second set of one or more VR-related Performance Measurements.

Example 50 is an apparatus configured to be employed within a NM (Network Manager), comprising: a memory interface; and processing circuitry configured to: receive one or more Virtualized Resource (VR)-related performance measurements for at least one of one or more Third Generation Partnership Project (3GPP) Network Function (NF) Managed Object Instances (MOIs) from an Element Manager (EM); and send the one or more VR-related Performance Measurements to a memory via the memory interface.

Example 51 comprises the subject matter of any variation of any of example(s) 50, wherein the processing circuitry is further configured to: analyze the one or more VR-related Performance Measurements; correlate the one or more VR-related Performance Measurements with one or more 3GPP NF-related Performance Measurements; determine whether one or more performance issues exist on the 3GPP NF that are caused by the VR; and when the one or more performance issues exist, take one or more actions to address the one or more performance issues exist.

Example 52 comprises the subject matter of any variation of any of example(s) 50-51, wherein each of the one or more VR-related Performance Measurements is one of a mean virtual Central Processing Unit (CPU) usage, a peak virtual CPU usage, a mean virtual memory usage, a peak virtual memory usage, a mean virtual disk usage, a peak virtual disk usage.

Example 53 comprises the subject matter of any variation of any of example(s) 50-52, wherein the VR is a virtualized compute resource.

Example 54 comprises the subject matter of any variation of any of example(s) 50-53, wherein each of the one or more VR-related Performance Measurements is split into one or more associated sub-counters.

Example 55 comprises the subject matter of any variation of any of example(s) 54, wherein each of the one or more associated sub-counters is associated with a distinct virtual compute instance.

Example 56 comprises the subject matter of any variation of any of example(s) 50-55, wherein the 3GPP NF is a portion of one of an Evolved Packet Core (EPC) or an Internet Protocol (IP) Multimedia Subsystem (IMS).

Example 57 comprises the subject matter of any variation of any of example(s) 50-56, wherein each of the one or more MOIs is one of the IOC (Information Object Class) MMEFunction (the IOC for Mobility Management Entity), the IOC PGWFunction (the IOC for Packet Data Network (PDN) GateWay), the IOC ServingGWFunction (the IOC for Serving GateWay), the IOC MBMSGWFunction (the IOC for Multimedia Broadcast Multicast Service GateWay), the IOC PCRFFunction (the IOC for Policy and Charging Rules Function (PCRF)), the IOC PCSCFFunction (the IOC for Proxy Call Session Control Function (CSCF)), the IOC SCSCFFunction (the IOC for Serving CSCF Function), the IOC HSSFunction (the IOC for Home Subscriber Service (HSS)), the IOC BGCFFunction (the IOC for Breakout Gateway Control Function (BGCF)), the IOC MGCFFunction (the IOC for Media Gateway Control Function (MGCF)), the IOC MRFCFunction (the IOC for Multimedia Resource Function Controller (MRFC)), the IOC MRFPFunction (the IOC for Multimedia Resource Function Processor (MRFP)), the IOC SLFFunction (the IOC for Subscriber Location Function (SLF)), the IOC ASFunction (the IOC for Application Server(s) (AS)), or the IOC IBCFFunction (the IOC for Interconnection Border Control Function (IBCF)).

Example 58 is an apparatus configured to be employed within an EM (Element Manager), comprising: a memory interface; and processing circuitry configured to: receive one or more Virtualized Resource (VR)-related performance measurements from a Virtualized Network Function (VNF) Manager (VNFM), wherein each VR-related Performance Measurement of the one or more VR-related Performance Measurements has a measured object that is one of an associated VNF instance or an associated VNF Component (VNFC) instance; and send the one or more VR-related Performance Measurements to a memory via the memory interface.

Example 59 comprises the subject matter of any variation of any of example(s) 50, wherein each VR-related Performance Measurement of the one or more VR Performance Measurements is one of a mean virtual CPU usage, a peak virtual CPU usage, a mean memory usage, a peak memory usage, a mean disk usage, a peak disk usage, a number of incoming bytes, a number of outgoing bytes, a number of incoming packets, or a number of outgoing packets.

Example 60 comprises the subject matter of any variation of any of example(s) 58-59, wherein each VR-related Performance Measurement of the one or more VR-related Performance Measurements is identified by an associated measurement name.

Example 61 comprises the subject matter of any variation of any of example(s) 60, wherein each VR-related Performance Measurement of the one or more VR-related Performance Measurements is associated with an associated sub-counter and has an associated measurement type, wherein the associated measurement name of each VR-related Performance Measurement is an associated <measurement type>.<sub-counter name>, wherein a <measurement type> of the associated <measurement type>.<sub-counter name> is the associated measurement type of that VR-related Performance Measurement, and wherein a <sub-counter name> of the associated <measurement type>.<sub-counter name> is a name of the associated sub-counter of that VR-related Performance Measurement.

Example 62 comprises the subject matter of any variation of any of example(s) 6-61, wherein the processing circuitry is further configured to generate a performance report that comprises an associated performanceMetric (performance metric) parameter for each VR-related Performance Measurement of the one or more VR-related Performance Measurements that indicates the associated measurement name of that VR-related Performance Measurement.

Example 63 comprises the subject matter of any variation of any of example(s) 60-62, the processing circuitry is further configured to generate a Performance Measurement job in response to a request to create a Performance Measurement job, wherein the Performance Measurement job comprises an associated performanceMetric (performance metric) parameter for each VR-related Performance Measurement of the one or more VR-related Performance Measurements that indicates the associated measurement name of that VR-related Performance Measurement.

Example 64 comprises the subject matter of any variation of any of example(s) 63, wherein each VR-related Performance Measurement of the one or more VR-related Performance Measurements is associated with an associated sub-counter, and wherein the Performance Measurement job indicates the associated sub-counter for each VR-related Performance Measurement of the one or more VR-related Performance Measurements.

Example 65 is an apparatus configured to be employed within an OSS (Operation Support System), comprising: a memory interface; and processing circuitry configured to: receive one or more Virtualized Resource (VR)-related performance measurements from a Virtualized Network Function (VNF) Manager (VNFM), wherein each VR-related Performance Measurement of the one or more VR-related Performance Measurements has a measured object that is an associated Network Service (NS) instance; and send the one or more VR-related Performance Measurements to a memory via the memory interface.

Example 66 comprises the subject matter of any variation of any of example(s) 65, wherein each VR-related Performance Measurement of the one or more VR Performance Measurements is one of a mean virtual CPU usage, a peak virtual CPU usage, a mean memory usage, a peak memory usage, a mean disk usage, a peak disk usage, a number of incoming bytes, a number of outgoing bytes, a number of incoming packets, or a number of outgoing packets.

Example 67 comprises the subject matter of any variation of any of example(s) 65-66, wherein each VR-related Performance Measurement of the one or more VR-related Performance Measurements is identified by an associated measurement name.

Example 68 comprises the subject matter of any variation of any of example(s) 67, wherein each VR-related Performance Measurement of the one or more VR-related Performance Measurements is associated with an associated sub-counter and has an associated measurement type, wherein the associated measurement name of each VR-related Performance Measurement is an associated <measurement type>.<sub-counter name>, wherein a <measurement type> of the associated <measurement type>.<sub-counter name> is the associated measurement type of that VR-related Performance Measurement, and wherein a <sub-counter name> of the associated <measurement type>.<sub-counter name> is a name of the associated sub-counter of that VR-related Performance Measurement.

Example 69 comprises the subject matter of any variation of any of example(s) 67, wherein the processing circuitry is further configured to generate a performance report that comprises an associated performanceMetric (performance metric) parameter for each VR-related Performance Measurement of the one or more VR-related Performance Measurements that indicates the associated measurement name of that VR-related Performance Measurement.

Example 70 comprises the subject matter of any variation of any of example(s) 67, the processing circuitry is further configured to generate a Performance Measurement job in response to a request to create a Performance Measurement job, wherein the Performance Measurement job comprises an associated performanceMetric (performance metric) parameter for each VR-related Performance Measurement of the one or more VR-related Performance Measurements that indicates the associated measurement name of that VR-related Performance Measurement.

Example 71 comprises the subject matter of any variation of any of example(s) 70, wherein each VR-related Performance Measurement of the one or more VR-related Performance Measurements is associated with an associated sub-counter, and wherein the Performance Measurement job indicates the associated sub-counter for each VR-related Performance Measurement of the one or more VR-related Performance Measurements.

Example 72 comprises an apparatus comprising means for executing any of the described operations of examples 1-71.

Example 73 comprises a machine readable medium that stores instructions for execution by a processor to perform any of the described operations of examples 1-71.

Example 74 comprises an apparatus comprising: a memory interface; and processing circuitry configured to: perform any of the described operations of examples 1-71.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within an EM (Element Manager), comprising:
a memory interface; and
processing circuitry configured to:
receive one or more Virtualized Resource (VR)-related performance measurements for at least one of one or more Virtual Network Function (VNF) instances or one or more VNF Component (VNFC) instances from a VNF Manager (VNFM) in at least one collection period;
map one or more measured objects from the at least one of the one or more VNFs or the one or more VNFCs to one or more Managed Object Instances (MOIs) of a Third Generation Partnership Project (3GPP) Network Function (NF);
generate one or more 3GPP performance measurements for the one or more MOIs from the mapped one or more measured objects; and
send the one or more 3GPP performance measurements to a memory via the memory interface.

2. The apparatus of claim 1, wherein the processing circuitry is further configured to report the one or more 3GPP performance measurements for one or more measured objects to a Network Manager (NM).

3. The apparatus of claim 1, wherein each of the one or more VR-related performance measurements is one of a mean virtual Central Processing Unit (CPU) usage, a peak virtual CPU usage, a mean virtual memory usage, a peak virtual memory usage, a mean virtual disk usage, a peak virtual disk usage.

4. The apparatus of claim 1, wherein the VR is a virtualized compute resource, a virtual CPU, a virtual memory, or a virtual disk.

5. The apparatus of claim 1, wherein each of the one or more VR-related performance measurements is split into one or more associated sub-counters.

6. The apparatus of claim 5, wherein each of the one or more associated sub-counters is associated with a distinct virtual compute instance.

7. The apparatus of claim 1, wherein the 3GPP NF is a portion of one of an Evolved Packet Core (EPC) or an Internet Protocol (IP) Multimedia Subsystem (IMS).

8. The apparatus of claim 1, wherein each of the one or more MOIs is one of the IOC (Information Object Class) MMEFunction (the IOC for Mobility Management Entity), the IOC PGWFunction (the IOC for Packet Data Network (PDN) GateWay), the IOC ServingGWFunction (the IOC for Serving GateWay), the IOC MBMSGWFunction (the IOC for Multimedia Broadcast Multicast Service GateWay), the IOC PCRFFunction (the IOC for Policy and Charging Rules Function (PCRF)), the IOC PCSCFFunction (the IOC for Proxy Call Session Control Function (CSCF)), the IOC SCSCFFunction (the IOC for Serving CSCF Function), the IOC HSSFunction (the IOC for Home Subscriber Service (HSS)), the IOC BGCFFunction (the IOC for Breakout Gateway Control Function (BGCF)), the IOC MGCFFunction (the IOC for Media Gateway Control Function (MGCF)), the IOC MRFCFunction (the IOC for Multimedia Resource Function Controller (MRFC)), the IOC MRFPFunction (the IOC for Multimedia Resource Function Processor (MRFP)), the IOC SLFFunction (the IOC for Subscriber Location Function (SLF)), the IOC ASFunction (the IOC for Application Server(s) (AS)), or the IOC IBCF-Function (the IOC for Interconnection Border Control Function (IBCF)).

9. The apparatus of claim 1, wherein each of the at least one of the one or more VNFs or the one or more VNFCs is identified by an objectType (object type) parameter and an objectInstanceId (object instance identifier) parameter.

10. An apparatus configured to be employed within a VNFM (VNF (Virtual Network Function) Manager), comprising:
 a memory interface; and
 processing circuitry configured to:
  receive a first set of one or more Virtualized Resource (VR)-related performance measurements from a Virtualization Infrastructure Manager (VIM), wherein the first set of one or more VR-related performance measurements is for one or more VR instances;
  map one or more measured objects of the first set of one or more VR-related performance measurements from the one or more VR instances to at least one of one or more Virtual Network Function (VNF) instances or one or more VNF Component (VNFC) instances of a Third Generation Partnership Project (3GPP) Network Function (NF);
  generate a second set of one or more VR-related performance measurements for the at least one of the one or more VNF instances or the one or more VNFC instances; and
  send the first set of one or more VR-related performance measurements to a memory via the memory interface.

11. The apparatus of claim 10, wherein the processing circuitry is further configured to one of:
 report the second set of one or more VR-related performance measurements to an Element Manager (EM); or
 report the second set of one or more VR-related performance measurements to a Network Function Virtualization Orchestrator (NFVO), wherein the at least one of the one or more VNF instances or one or more VNFC instances is the one or more VNF instances.

12. The apparatus of claim 10, wherein each of the one or more VR instances is one of a virtual compute instance, a virtual storage instance, or a virtual network interface.

13. The apparatus of claim 10, wherein each VR-related performance measurements of the first set of one or more VR performance measurements or the second set of one or more VR performance measurements is one of a mean virtual CPU usage, a peak virtual CPU usage, a mean memory usage, a peak memory usage, a mean disk usage, a peak disk usage, a number of incoming bytes, a number of outgoing bytes, a number of incoming packets, or a number of outgoing packets.

14. The apparatus of claim 10, wherein the processing circuitry is further configured to perform processing on the second set of one or more VR-related performance measurements.

15. The apparatus of claim 14, wherein the processing comprises assigning the second set of one or more VR-related performance measurements to one or more sub-counters of the first set of VR-related performance measurements.

16. The apparatus of claim 15, wherein each of the one or more sub-counters is associated with a distinct VR instance of the one or more VR instances.

17. The apparatus of claim 10, wherein each VR-related performance measurement of the first set of one or more VR-related performance measurements and the second set of one or more VR-related performance measurements is identified by an associated measurement name.

18. The apparatus of claim 17, wherein each VR-related performance measurement of the second set of one or more VR-related performance measurements is associated with an associated sub-counter and has an associated measurement type, wherein the associated measurement name of each VR-related performance measurement is an associated <measurement type>.<sub-counter name>, wherein a <measurement type> of the associated <measurement type>.<sub-counter name> is the associated measurement type of that VR-related performance measurement, and wherein a <sub-counter name> of the associated <measurement type>.<sub-counter name> is a name of the associated sub-counter of that VR-related performance measurement.

19. The apparatus of claim 17, wherein the processing circuitry is further configured to generate a performance report that comprises an associated performanceMetric (performance metric) parameter for each VR-related performance measurement of the second set of one or more VR-related performance measurements that indicates the associated measurement name of that VR-related performance measurement.

20. The apparatus of claim 17, the processing circuitry is further configured to generate a PM job in response to a request to create a PM job, wherein the PM job comprises an associated performanceMetric (performance metric) parameter for each VR-related performance measurement of the second set of one or more VR-related performance measurements that indicates the associated measurement name of that VR-related performance measurement.

21. The apparatus of claim 20, wherein each VR-related performance measurement of the second set of one or more VR-related performance measurements is associated with an associated sub-counter, and wherein the PM job indicates the associated sub-counter for each VR-related performance measurement of the second set of one or more VR-related performance measurements.

22. An apparatus configured to be employed within a VIM (Virtualization Infrastructure Manager), comprising:
 a memory interface; and
 processing circuitry configured to:
  receive a first set of one or more Virtualized Resource (VR)-related performance measurements from an NFVI (Network Function Virtualization Infrastructure) in a pre-defined interval associated with a collection period, wherein the first set of one or more VR-related performance measurements is for one or more VR instances for a Third Generation Partnership Project (3GPP) Network Function (NF);

perform processing on the first set of one or more VR-related performance measurements, wherein the processing performed on the first set of one or more VR-related performance measurements comprises assigning the second set of one or more VR-related performance measurements to one or more sub-counters of the first set of VR-related performance measurements;

generate a second set of one or more VR-related performance measurements associated with a selected VR instance of the one or more VR instances; and send the first set of one or more VR-related performance measurements to a memory via the memory interface.

23. The apparatus of claim 22, wherein the processing circuitry is further configured to one of:
report the second set of one or more VR-related performance measurements to a VNFM (Virtual Network Function Manager); or
report the second set of one or more VR-related performance measurements to a NFVO (Network Function Virtualization Orchestrator).

24. The apparatus of claim 22, wherein the processing performed on the first set of one or more VR-related performance measurements comprises one of taking an arithmetic mean of the first set of one or more VR-related performance measurements or selecting a maximum value of the first set of one or more VR-related performance measurements.

25. The apparatus of claim 22, wherein each of the one or more VR instances is one of a virtual compute instance, a virtual storage instance, or a virtual network interface.

26. The apparatus of claim 22, wherein each VR-related performance measurement of the first set of one or more VR performance measurements or the second set of one or more VR performance measurements is one of a mean virtual CPU usage, a peak virtual CPU usage, a mean memory usage, a peak memory usage, a mean disk usage, a peak disk usage, a number of incoming bytes, a number of outgoing bytes, a number of incoming packets, or a number of outgoing packets.

27. The apparatus of claim 22, wherein each of the one or more sub-counters is associated with a distinct VR instance of the one or more VR instances.

28. The apparatus of claim 22, wherein each VR-related performance measurement of the first set of one or more VR-related performance measurements and the second set of one or more VR-related performance measurements is identified by an associated measurement name.

29. An apparatus configured to be employed within a NFVO (NFV (Network Function Virtualization) Orchestrator), comprising:
a memory interface; and
processing circuitry configured to:
receive a first set of one or more Virtualization Resource (VR)-related Performance Measurements from a Virtualization Infrastructure Manager (VIM) for one or more VR instances for a Third Generation Partnership Project (3GPP) Network Function (NF);
map one or more measured objects (MOs) of the first set of one or more VR-related performance measurements from the one or more VR instances to one or more Network Service (NS) instances;
perform processing on the first set of one or more VR-related performance measurements based on the mapping of the one or more MOs of the first set of one or more VR-related performance measurements;
generate a second set of one or more VR-related performance measurements associated with the one or more NS instances;
report the second set of one or more VR-related performance measurements to an Operation Support System (OSS), wherein the one or more NS instances are one or more MOs of the second set of one or more VR-related performance measurements; and
send the first set of one or more VR-related performance measurements to a memory via the memory interface.

30. The apparatus of claim 29, wherein each VR-related performance measurement of the first set of one or more VR-related performance measurements and the second set of one or more VR-related performance measurements has an associated performance value, wherein the processing comprises taking, for each NS instance of the one or more NS instances, a sum of associated performance values of each VR-related performance measurements associated with that NS instance.

31. The apparatus of claim 29, wherein each VR-related performance measurement of the first set of one or more VR performance measurements or the second set of one or more VR performance measurements is one of a mean virtual CPU usage, a peak virtual CPU usage, a mean memory usage, a peak memory usage, a mean disk usage, a peak disk usage, a number of incoming bytes, a number of outgoing bytes, a number of incoming packets, or a number of outgoing packets.

* * * * *